United States Patent
Kim

(10) Patent No.: US 12,292,898 B2
(45) Date of Patent: *May 6, 2025

(54) INTERACTIVE INTERFACE FOR DATA ANALYSIS AND REPORT GENERATION

(71) Applicant: Tableau Software, LLC, Seattle, WA (US)

(72) Inventor: Jun Ho Kim, Sammamish, WA (US)

(73) Assignee: Tableau Software, LLC, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/433,318

(22) Filed: Feb. 5, 2024

(65) Prior Publication Data

US 2024/0296170 A1 Sep. 5, 2024

Related U.S. Application Data

(63) Continuation of application No. 17/866,091, filed on Jul. 15, 2022, now Pat. No. 11,893,039, which is a (Continued)

(51) Int. Cl.
*G06F 16/26* (2019.01)
*G06F 16/21* (2019.01)
*G06F 16/245* (2019.01)

(52) U.S. Cl.
CPC .............. *G06F 16/26* (2019.01); *G06F 16/21* (2019.01); *G06F 16/212* (2019.01); *G06F 16/245* (2019.01)

(58) Field of Classification Search
CPC ...... G06F 16/212; G06F 16/21; G06F 16/245; G06F 16/248; G06F 16/26
(Continued)

(56) References Cited

U.S. PATENT DOCUMENTS 7,010,364 B1* 3/2006 Singh ............... G05B 19/41885
702/179
8,099,674 B2 1/2012 Mackinlay et al.
(Continued)

FOREIGN PATENT DOCUMENTS

JP 2007-249354 A 9/2007
JP 2008-217480 A 9/2008
(Continued)

OTHER PUBLICATIONS

Office Communication for U.S. Appl. No. 16/732,027 mailed Jan. 17, 2023, pp. 1-5.
(Continued)

*Primary Examiner* — Shahid A Alam
(74) *Attorney, Agent, or Firm* — Morgan, Lewis & Bockius LLP

(57) ABSTRACT

Embodiments are directed to managing data visualizations. A primary visualization that is associated with a data model may be provided such that the primary visualization may be displayed in a display panel. Insight items may be generated based on the primary visualization and the data model such that the insight items may correspond to one or more visualizations that may share one or more portions of the data model and such that the insight items may be displayed in an insight panel. In response to an insight item being selected from the insight panel, additional actions may be performed, including: generating a visualization based on the insight item that is displayed in the display panel instead of the primary visualization; and generating a scratch item that includes a thumbnail view of the primary visualization such that the thumbnail view is displayed in a scratch panel.

20 Claims, 11 Drawing Sheets

Related U.S. Application Data continuation of application No. 16/944,064, filed on Jul. 30, 2020, now Pat. No. 11,397,746.

(58) Field of Classification Search
USPC .................................................. 707/736
See application file for complete search history.

(56) References Cited

U.S. PATENT DOCUMENTS

| | | |
|---|---|---|
| 8,589,811 B2 | 11/2013 | Gotz |
| 8,983,994 B2 | 3/2015 | Neels et al. |
| 9,335,911 B1 | 5/2016 | Elliot et al. |
| 9,361,320 B1 | 6/2016 | Vijendra et al. |
| 9,418,105 B2 | 8/2016 | Buchheit et al. |
| 9,613,086 B1 | 4/2017 | Sherman |
| 9,779,147 B1 | 10/2017 | Sherman et al. |
| 9,977,807 B1 | 5/2018 | Bowman |
| 10,460,332 B1 | 10/2019 | Kujat et al. |
| 10,552,513 B1 | 2/2020 | Harkare |
| 10,572,544 B1 | 2/2020 | Zhang et al. |
| 10,572,804 B1 | 2/2020 | Hilley |
| 10,572,859 B1 | 2/2020 | Evans et al. |
| 10,572,925 B1 | 2/2020 | Roy Chowdhury et al. |
| 10,592,525 B1 | 3/2020 | Khante et al. |
| 10,642,723 B1 | 5/2020 | Krishnamoorthy |
| 10,705,695 B1 | 7/2020 | Porath et al. |
| 10,719,332 B1 | 7/2020 | Dwivedi et al. |
| 10,775,976 B1 | 9/2020 | Abdul-Jawad et al. |
| 10,929,415 B1 | 2/2021 | Shcherbakov et al. |
| 10,963,347 B1 | 3/2021 | Chen et al. |
| 11,074,301 B2 * | 7/2021 | Williams ............... G06F 16/904 |
| 11,232,506 B1 | 1/2022 | Zielnicki |
| 2005/0134589 A1 | 6/2005 | Heer et al. |
| 2007/0136285 A1 | 6/2007 | Cormode et al. |
| 2008/0168135 A1 | 7/2008 | Redlich et al. |
| 2009/0105984 A1 | 4/2009 | Wen et al. |
| 2011/0137850 A1 | 6/2011 | Mourey et al. |
| 2011/0296309 A1 | 12/2011 | Ngan |
| 2011/0302110 A1 | 12/2011 | Beers et al. |
| 2012/0229466 A1 | 9/2012 | Richie et al. |
| 2012/0233182 A1 | 9/2012 | Baudel et al. |
| 2013/0091465 A1 | 4/2013 | Kikin-Gil et al. |
| 2013/0103677 A1 | 4/2013 | Chakra et al. |
| 2013/0204894 A1 | 8/2013 | Faith et al. |
| 2013/0300463 A1 | 11/2013 | Gemmeke et al. |
| 2014/0019443 A1 | 1/2014 | Golshan |
| 2014/0032548 A1 | 1/2014 | Gilra et al. |
| 2014/0059017 A1 | 2/2014 | Chaney et al. |
| 2014/0074889 A1 | 3/2014 | Neels et al. |
| 2014/0129493 A1 | 5/2014 | Leopold |
| 2014/0156223 A1 * | 6/2014 | Toomre ............... G06F 17/18 702/179 |
| 2014/0344008 A1 | 11/2014 | Gammage et al. |
| 2015/0112894 A1 | 4/2015 | Lingappa |
| 2015/0278214 A1 | 10/2015 | Anand et al. |
| 2016/0034305 A1 | 2/2016 | Shear et al. |
| 2016/0092408 A1 | 3/2016 | Lagerblad et al. |
| 2016/0092576 A1 | 3/2016 | Quercia et al. |
| 2016/0103908 A1 * | 4/2016 | Fletcher ............... G06F 16/903 707/722 |
| 2016/0196534 A1 | 7/2016 | Jarrett et al. |
| 2016/0307210 A1 | 10/2016 | Agarwal et al. |
| 2016/0307233 A1 | 10/2016 | Pan et al. |
| 2016/0350950 A1 * | 12/2016 | Ritchie ............... G06F 40/18 |
| 2016/0357829 A1 * | 12/2016 | Fung ............... G06F 16/958 |
| 2016/0364770 A1 | 12/2016 | Denton et al. |
| 2017/0031449 A1 * | 2/2017 | Karsten ............... G06Q 10/1095 |
| 2017/0061659 A1 | 3/2017 | Puri et al. |
| 2017/0069118 A1 | 3/2017 | Stewart |
| 2017/0124617 A1 | 5/2017 | Spoelstra et al. |
| 2017/0132489 A1 | 5/2017 | Simgi |
| 2017/0140118 A1 | 5/2017 | Haddad et al. |
| 2017/0154088 A1 | 6/2017 | Sherman |
| 2017/0154089 A1 | 6/2017 | Sherman |
| 2017/0220633 A1 | 8/2017 | Porath et al. |
| 2017/0308913 A1 | 10/2017 | Chao et al. |
| 2018/0004363 A1 | 1/2018 | Tompkins |
| 2018/0032492 A1 * | 2/2018 | Altshuller ............ G06F 16/9024 |
| 2018/0039399 A1 | 2/2018 | Kaltegaertner et al. |
| 2018/0121035 A1 | 5/2018 | Filippi et al. |
| 2018/0129369 A1 | 5/2018 | Kim et al. |
| 2018/0210936 A1 * | 7/2018 | Reynolds ............... G06F 16/258 |
| 2018/0232405 A1 | 8/2018 | Samara et al. |
| 2018/0267676 A1 | 9/2018 | Glueck et al. |
| 2018/0285772 A1 | 10/2018 | Gopalan |
| 2018/0343321 A1 | 11/2018 | Chang |
| 2019/0012553 A1 | 1/2019 | Maruchi et al. |
| 2019/0026681 A1 | 1/2019 | Polli et al. |
| 2019/0043506 A1 | 2/2019 | Rivkin et al. |
| 2019/0102425 A1 | 4/2019 | Obeidat |
| 2019/0108272 A1 | 4/2019 | Talbot et al. |
| 2019/0129964 A1 | 5/2019 | Corbin, II et al. |
| 2019/0130512 A1 | 5/2019 | Kuhn |
| 2019/0179621 A1 | 6/2019 | Salgado et al. |
| 2019/0188333 A1 | 6/2019 | Williams et al. |
| 2019/0213608 A1 | 7/2019 | Ouyang et al. |
| 2019/0339688 A1 | 11/2019 | Cella et al. |
| 2019/0355447 A1 | 11/2019 | Barkol et al. |
| 2020/0012939 A1 | 1/2020 | Hu et al. |
| 2020/0019546 A1 | 1/2020 | Luo et al. |
| 2020/0050636 A1 | 2/2020 | Datla et al. |
| 2020/0066397 A1 | 2/2020 | Rai et al. |
| 2020/0104731 A1 | 4/2020 | Oliner et al. |
| 2020/0134545 A1 | 4/2020 | Appel et al. |
| 2020/0233559 A1 | 7/2020 | Rueter et al. |
| 2020/0250472 A1 * | 8/2020 | Abhyankar ......... G06F 18/2411 |
| 2020/0250562 A1 | 8/2020 | Bly |
| 2020/0311680 A1 | 10/2020 | Wahl et al. |
| 2020/0320462 A1 | 10/2020 | Wang et al. |
| 2020/0333777 A1 | 10/2020 | Maruyama |
| 2020/0372472 A1 * | 11/2020 | Kenthapadi ....... G06F 16/24578 |
| 2020/0403944 A1 | 12/2020 | Joshi et al. |
| 2020/0410001 A1 | 12/2020 | Sarkissian |
| 2021/0011961 A1 | 1/2021 | Guan et al. |
| 2021/0019338 A1 | 1/2021 | Grampurohit et al. |
| 2021/0019357 A1 | 1/2021 | Bennett et al. |
| 2021/0049143 A1 | 2/2021 | Jacinto et al. |
| 2021/0081377 A1 | 3/2021 | Polleri et al. |
| 2021/0088418 A1 | 3/2021 | Sato et al. |
| 2021/0110288 A1 | 4/2021 | Poothiyot et al. |
| 2021/0133632 A1 | 5/2021 | Elprin et al. |
| 2021/0194783 A1 | 6/2021 | Sinha et al. |
| 2021/0313070 A1 | 10/2021 | Toyoshiba et al. |
| 2021/0365856 A1 | 11/2021 | Mukherjee et al. |
| 2022/0019947 A1 * | 1/2022 | Mitelman ............ G06F 16/904 |
| 2022/0147540 A1 | 5/2022 | Rossi et al. |
| 2022/0317979 A1 | 10/2022 | Araujo Soares et al. |

FOREIGN PATENT DOCUMENTS

| | | |
|---|---|---|
| JP | 2009-534752 A | 9/2009 |
| JP | 2017-174176 A | 9/2017 |
| JP | 2021-6991 A | 1/2021 |
| WO | 2014010071 | 1/2014 |
| WO | 2015030214 | 3/2015 |

OTHER PUBLICATIONS

Office Communication for U.S. Appl. No. 16/672,130 mailed Feb. 13, 2023, pp. 1-34.

Office Communication for U.S. Appl. No. 17/158,911 mailed Mar. 8, 2023, pp. 1-6.

Office Communication for U.S. Appl. No. 16/732,027 mailed Mar. 8, 2023, pp. 1-9.

Office Communication for U.S. Appl. No. 17/588,145 mailed Apr. 26, 2023, pp. 1-16.

Office Communication for U.S. Appl. No. 17/158,911 mailed Apr. 27, 2023, pp. 1-40.

Office Communication for U.S. Appl. No. 16/732,027 mailed Oct. 28. 2022, pp. 1-11.

Office Communication for U.S. Appl. No. 17/158,911 mailed Dec. 23. 2022, pp. 1-37.

(56) References Cited

OTHER PUBLICATIONS

Office Communication for U.S. Appl. No. 16/672,130 mailed Aug. 2, 2022, pp. 1-5.
Office Communication for U.S. Appl. No. 16/944,085 mailed Aug. 30, 2022, pp. 1-9.
Office Communication for U.S. Appl. No. 16/944,085 mailed Sep. 9, 2022, pp. 1-2.
Office Communication for U.S. Appl. No. 16/672,130 mailed Sep. 13, 2022, pp. 1-35.
Office Communication for U.S. Appl. No. 17/014,882 mailed Sep. 28, 2022, pp. 1-11.
Office Communication for U.S. Appl. No. 16/915,963 mailed Oct. 5, 2022, pp. 1-7.
Office Communication for U.S. Appl. No. 16/672,130 mailed May 19, 2023, pp. 1-5.
Office Communication for U.S. Appl. No. 17/344,633 mailed Jun. 27, 2023, pp. 1-43.
Office Communication for U.S. Appl. No. 16/672,130 mailed Jul. 3, 2023, pp. 1-39.
Negash, Solomon, "Business Intelligence," Communications of the Association for Information Systems, 2004, vol. 13, pp. 177-195.
Eckerson, Wayne W., "Performance Dashboards Measuring, Monitoring, and Managing Your Business," Business Summaries, 2012, pp. 1-11.
Lizotte-Latendresse, Simon et al., "Implementing self-service business analytics supporting lean manufacturing: A state-of-the-art review," 16th IFAC Symposium-Incom, 2018, pp. 1143-1148.
Groger, Christoph et al., "The Operational Process Dashboard for Manufacturing," SciVerse Science Direct, CIRP 7, 2013, pp. 205-210.
Yigitbasioglu, Ogan M. et al., A review of dashboards in performance management: Implications for design and International Journal of Accounting Information Systems, 2012, vol. 13, pp. 41-59.
Adam, Frederic et al., "Developing Practical Decision Support Tools Using Dashboards of Information," In: Handbook on Decision Support Systems 2. International Handbooks Information System, Springer, Berlin, Heidelberg, 2008, pp. 151-173.
Passlick, Jens et al., "A Self-Service Supporting Business Intelligence and Big Data Analytics Architecture," Proceedings of the 13th International Conference on Wirtschaftsinformatik, 2017, pp. 1126-1140.
Shneiderman, Ben, "The Eyes Have It: A Task by Data Type Taxonomy for Information Visualizations," Proc. Languages, 1996, pp. 1-9.
Alpar, Paul et al., "Self-Service Business Intelligence," Business & Information Systems Engineering, 2016, vol. 58, pp. 151-155.
Kaur, Pawandeep et al., "A Review on Visualization Recommendation Strategies," In Proceedings of the 12th International Joint Conference on Computer Vision, Imaging and Computer Graphics Theory and Applications, 2017, vol. 3, pp. 266-273.
Hoang, Duong Thi Anh et al., "Dashboard by-Example: A Hypergraph-based Approach to On-demand Data systems," IEEE International Conference on Systems, Man, and Cybernetics, 2012, pp. 1853-1858.
Zhang, Shuo et al., "Ad Hoc Table Retrieval using Semantic Similarity," IVV3C2, Creative Commons CC BY 4.0 License, 2018, pp. 1553-1562.
Key, Alicia et al., "VizDeck: Self-Organizing Dashboards for Visual Analytics," SIGMOD International Conference on of Data, 2012, pp. 681-684.
Mackinlay, Jock, "Automating the Design of Graphical Presentations of Relational Information," ACM Transactions Graphics, 1986, vol. 5, No. 2, pp. 110-141.
Touma, Rizkallah et al., "Supporting Data Integration Tasks with Semi-Automatic Ontology Construction," DOLAP Proceedings of the ACM Eighteenth International Workshop on Data Warehousing and OLAP, 2015, pp. 89-98.
Mazumdar, Suvodeep et al., "A Knowledge Dashboard for Manufacturing Industries," ESWC 2011 Workshops, 7117, 2012, pp. 112-124.
Matera, Maristella et al., PEUDOM: A Mashup Platform for the End User Development of Common Information ICWE 2013, LNCS 7977, 2013, pp. 494-497.
Theorin, Alfred et al., "An Event-Driven Manufacturing Information System Architecture," IFAC/IEEE Symposium Information Control Problems in Manufacturing, 2015, pp. 1-9.
Lennerholt, Christian et al., Implementation Challenges of Self Service Business Intelligence: A Literature Proceedings of the 51st Hawaii International Conference on System Sciences, 2018, pp. 5055-5063.
Elias, Micheline et al., Exploration Views: Understanding Dashboard Creation and Customization for Visualization INTERACT 2011, Part IV, LNCS 6949, 2011, pp. 274-291.
Buccella, Agustina et al., "Ontology-Based Data Integration Methods: A Framework for Comparison, "Revista Colombiana de Computacion, 2005, vol. 6, No. 1, pp. 1-24.
Roberts, Jonathan C., "State of the Art: Coordinated & Multiple Views in Exploratory Visualization," Proceedings of the 5th International Conference on Coordinated & Multiple Views in Exploratory Visualization, IEEE Computer Society Press, 2007, pp. 61-71.
Palpanas, Themis et al., "Integrated model-driven dashboard development," Information Systems Frontiers, 2007, 9, pp. 1-14.
Resnick, Marc L., "Building the Executive Dashboard," Proceedings of the Human Factors and Ergonomics 47th Annual Meeting, 2003, pp. 1639-1643.
Sarikaya, Alper et al., "What Do We Talk About When We Talk About Dashboards?," IEEE Transactions on Visualization and Computer Graphics, 2018, pp. 1-11.
Boury-Brisset, Anne-Claire, "Ontology-based Approach for Information Fusion," Proceedings of the Sixth Conference on Information Fusion, 2003, vol. 1, pp. 522-529.
Park, Laurence A. F. et al., "A Blended Metric for Multi-label Optimisation and Evaluation," ECML/PKDD, 2018, pp. 1-16.
Kintz, Maximilien, A Semantic Dashboard Description Language for a Process-oriented Dashboard Design 2nd International Workshop on Mode-based Interactive Ubiquitous Systems, 2012, pp. 1-6.
Bergamaschi, Sonia et al., "A Semantic Approach to ETL Technologies," Data & Knowledge Engineering, 2011, pp. 1-24.
Office Communication for U.S. Appl. No. 16/368,390 mailed Mar. 2, 2020, pp. 1-8.
International Search Report and Written Opinion for International Patent Application No. PCT/US2020/038157 mailed 6, 2020, pp. 1-8.
International Search Report and Written Opinion for International Patent Application No. PCT/US2020/057780 mailed Feb. 2021, pp. 1-8.
Barovvy, Daniel W. et al., "ExceLint: Automatically Finding Spreadsheet Formula Errors," In Proceedings of the Programming Languages 2, OOPSLA, 2018, Article 148, pp. 1-26.
Barovvy, Daniel W. et al., "CheckCell: Data Debugging for Spreadsheets," ACM Sigplan Notices, 2014, vol. 49, 10, pp. 507-523.
Donaldson, Alastair F. et al., "Automated Testing of Graphics Shader Compilers," In Proceedings of the ACM Languages 1, OOPSLA, 2017, Article 93, pp. 1-29.
Dragicevic, Pierre et al., "Increasing the Transparency of Research Papers with Explorable Multiverse Analyses," In Proceedings of The ACM CHI Conference on Human Factors in Computing Systems, 2019, Glasgow, United Kingdom, pp. 1-16.
Gotz, David et al., "Visualization Model Validation via Inline Replication," Information Visualization, 2019, pp. 405-425.
Guderlei, Ralph et al., "Statistical Metamorphic Testing—Testing Programs With Random Output by Means of Statistical Hypothesis Tests and Metaphoric Testing," In Seventh International Conference on Quality Software, IEEE, 2007, pp. 404-409.
Guo, Yue et al., "What You See is Not What You Get!: Detecting Simpson's Paradoxes During Data Exploration," In SIGMOD Workshop on Human-in-the-Loop Data Analytics (HILDA), 2017, Article 2, pp. 1-5.
Hynes, Nick et al., "The Data Linter: Lightweight, Automated Sanity Checking for ML Data Sets," In NIPS: Workshop Systems for ML and Open-Source Software, 2017, pp. 1-7.

(56) References Cited

OTHER PUBLICATIONS

Kindlmann, Gordon et al., "An Algebraic Process for Visualization Design," IEEE Transactions on Visualization Computer Graphics, 2014, vol. 20, No. 12, pp. 2181-2190.
Kirby, Robert M. et al., "The Need for Verifiable Visualization," IEEE Computer Graphics and Applications, 2008, 28, No. 5, pp. 78-83.
McNutt, Andrew et al., "Linting for Visualization: Towards a Practical Automated Visualization Guidance System," In VisGuides: 2nd Workshop on the Creation, Curation, Critique and Conditioning of Principles and Guidelines in Visualization, 2018, pp. 1-14.
Mu?lu, KIVANc et al., "Preventing Data Errors with Continuous Testing," In Proceedings of the 2015 International on Software Testing and Analysis, ACM, 2015, pp. 373-384.
Salimi, Babak et al., "Bias in OLAP Queries: Detection, Explanation, and Removal." In Proceedings of the 2018 Conference on Management of Data, ACM, 2018, pp. 1021-1035.
Tang, Nan et al., "Towards Democratizing Relational Data Visualization," In Proceedings of the 2019 International on Management of Data, ACM, 2019, pp. 2025-2030.
Wall, Emily et al., "Warning, Bias May Occur: A Proposed Approach to Detecting Cognitive Bias in Interactive Visual Analytics," In 2017 IEEE Conference on Visual Analytics Science and Technology (VAST), IEEE, 2017, pp. 104-115.
Wickham, Hadley et al., "Graphical Inference for Infovis," IEEE Transactions on Visualization and Computer 16, 2010, pp. 973-979.
Anand, Anushka et al., "Automatic Selection of Partitioning Variables for Small Mulitiple Displays," IEEE on Visualization and Computer Graphics, 2015, vol. 22, Iss. 1, pp. 669-677.
Anonymous, "Glitchart: When charts attack," https://glitch-chart.tumblr.com/. 2019, Accessed Feb. 5, 2020, p. 1.
Armstrong, Zan et al., "Visualizing Statistical Mix Effects and Simpson's Paradox," IEEE Transactions on and Computer Graphics, 2014, vol. 20, No. 12, pp. 2132-2141.
Barr, Earl T. et al., "The Oracle Problem in Software Testing: A Survey," IEEE Transactions on Software Engineering 2015, vol. 41, No. 5, pp. 507-525.
Binnig, Carsten et al., "Toward Sustainable Insights, or Why Polygamy is Bad for You," In Proceedings of the 8th Biennial Conference on Innovative Data Systems Research, 2017, pp. 1-7.
Borland, David et al., "Contextual Visualization," IEEE Computer Graphics and Applications, 2018, vol. 38, No. 6, pp. 17-23.
Bresciani, Sabrina et al., "The Risks of Visualization," Identitat and Vielfalt der Kommunikations-wissenschaft, 2009, pp. 1-22.
Bresciani, Sabrina et al., "The Pitfalls of Visual Representations: A Review and Classification of Common Errors While Designing and Interpreting Visualizations," SAGE Open, 2015, pp. 1-14.
Cairo, Alberto, "Graphic Lies, Misleading Visuals," In New Challenges for Data Design, Springer, 2015, pp. 103-116.
Chi, Ed Huai-Hsin, "A Taxonomy of Visualization Techniques Using the Data State Reference Model," In IEEE on Information Visualizations, 2000, pp. 69-75.
Chiw, Charisee et al., "DATm: Diderot's Automated Testing Model," In IEEE/ACM 12th International Workshop on of Software Testing (AST), IEEE, 2017, pp. 45-51.
Cleveland, William S. et al., Variables on Scatterplots Look More Highly Correlated When the Scales are Science, 1982, vol. 216, No. 4550, pp. 1138-1141.
Cockburn, Andy et al., "Hark No. More: On the Preregistration of CHI Experiments," In Proceedings of the 2018 Conference on Human Factors in Computing Systems, ACM, 2018, pp. 1-12.
Correll, Michael, "Ethical Dimensions of Visualization Research," In Proceedings of the 2019 CHI Conference on Factors in Computing Systems, ACM, 2019, pp. 1-13.
Correll, Michael et al., "Truncating the Y-Axis: Threat or Menace?," arXiv preprint arXiv:1907.02035, 2019, pp. 1-12.
Correll, Michael et al., "Surprise! Bayesian Weighting for De-Biasing Thematic Maps," IEEE Tranactions on Visualization and Computer Graphics, 2016, pp. 1-10.
Correll, Michael et al., "Black Hat Visualization," In IEEE VIS; Workshop on Dealing With Cognitive Biases in Visualizations, 2017, pp. 1-4.
Correll, Michael et al., "Looks Good to Me: Visualizations as Sanity Checks," IEEE Transactions on Visualizations and Computer Graphics, 2018, pp. 1-10.
Diehl, Alexandra et al., "VisGuides: A Forum for Discussing Visualization Guidelines," In Proceedings of the Eurographics/IEEE VGTC Conference on Visualization: Short Papers, Eurographics Asscociation, 2018, pp. 61-65.
D'Ignazio, Catherine et al., "Feminist Data Visualization," In IEEE VIS: Workshop on Visualization for the Digital (VIS4DH), 2016, pp. 1-5.
Dimara, Evanthia et al., "A Task-Based Taxonomy of Cognitive Biases for Information Visualization," IEEE on Visualization and Computer Graphics, 2018, pp. 1-21.
Dork, Marian et al., "Critical InfoVis: Exploring the Politics of Visualization," In 2013 ACM SIGCHI Conference on Human Factors in Computing Systems, Extended Abstracts, 2013, pp. 2189-2198.
Efron, Bradley, "Bootstrap Methods: Another Look at the Jackknife," The Annals of Statistics, 1979, vol. 7, No. 1, p. 1-26.
Filipov, Velitchko et al., "CV3: Visual Exploration, Assessment, and Comparison of CVs," In Computer Graphics Wiley Online Library, 2019, pp. 107-118.
Ford, Brian, "Write-Good: Naive Linter for English Prose," https://github.com/btford/write-good Accessed: pp. 1-6.
Gelman, Andrew et al., "The garden of forking paths: Why multiple comparisons can be a problem, even when there is no "fishing expedition" or "p-hacking" and the research hypothesis was posited ahead of time," Department of Statistics, Columbia University, 2013, pp. 1-17.
World Bank Group, "World Development Indicators," http://datatopics.worldbank.org/world-development indicators!, 2020, pp. 1-6.
Haraway, Donna, Situated Knowledges: The Science Question in Feminism and the Privilege of Partial Feminist Studies, 1988, vol. 14, No. 3, pp. 575-599.
Heer, Jeffrey, "Agency plus automation: Designing artificial intelligence into interactive systems," In Proceedings the National Academy of Sciences, 2019, vol. 116, No. 6, pp. 1844-1850.
Heer, Jeffrey, "Visualization is Not Enough," https:/homes.cs.washington. edu/Hheer/talks/EuroVis2019-EuroVis Capstone, 2019, pp. 1-113.
Heer, Jeffrey et al., "Multi-Scale Banking to 45 Degrees," IEEE Transactions on Visualization and Computer 2006, vol. 12, No. 5, pp. 701-708.
Hibbard, William L. et al., "A Lattice Model for Data Display," In Proceedings of the Conference on Visualization, Computer Society Press, 1994, pp. 310-317.
Hofmann, Heike et al., "Graphical Tests for Power Comparison of Competing Designs," IEEE Transactions on Visualization and Computer Graphics, 2012, vol. 18, No. 12, pp. 2441-2448.
Huff, Darrell, "How to Lie With Statistics," WWW Norton & Company, 31st Printing, 1993, pp. 1-141.
Hullman, Jessica et al., "Visualization Rhetoric: Framing Effects in Narrative Visualization," IEEE Transaction on Visualization and Computer Graphics, 2011, vol. 17, No. 12, pp. 2231-2240.
Isenberg, Tobias et al., "A Systematic Review on the Practice of Evaluating Visualization," IEEE Transactions on Visualization and Computer Graphics, 2013, vol. 19, No. 12, pp. 2818-2827.
Jannah, Hassan M., "MetaReader: A Dataset Meta-Exploration and Documentation Tool," 2014, pp. 1-11.
Johnson, Stephen C., "Lint, a C Program Checker," Citeseer, 1977, pp. 1-12.
Kandel, Sean et al., "Research directions in data wrangling: Visualizations and transformations for usable and data," Information Visualization, 2011, vol. 10, No. 4, pp. 271-288.
Kandel, Sean et al., "Profiler: Integrated Statistical Analysis and Visualization for Data Quality Assessment," In of the International Working Conference on Advanced Visual Interfaces, ACM, 2012, pp. 547-554.
Kim, Won et al., "A Taxonomy of Dirty Data," Data Mining and Knowledge Discovery, 2003, vol. 7, No. 1, pp. 81-89.

(56) References Cited

OTHER PUBLICATIONS

Kindlmann, Gordon et al., "Algebraic Visualization Design for Pedagogy," IEEE Vis: Workshop on Pedagogy of Visualization, 2016, pp. 1-5.
Kong, Ha-Kyung et al., "Frames and Slants in Titles of Visualizations on Controversial Topics," In Proceedings of 2018 CHI Conference on Human Factors in Computing Systems, ACM, 2018, pp. 1-12.
Kong, Ha-Kyung et al., "Trust and Recall of Information across Varying Degrees of Title—Visualization Misalignment," In Proceedings of the 2019 CHI Conference on Human Factors In Computing Systems, ACM, 2019, 346, pp. 1-13.
Amperser Labs, "Proselint: A linter for prose," http:/proselint.com/, Accessed: Feb. 10, 2020, pp. 1-3.
Lavigne, Sam et al., "Predicting Financial Crime: Augmenting the Predictive Policing Arsenal," arXiv preprint arXiv.07826, 2017, pp. 1-8.
Ziemkiewicz, Caroline et al., "Embedding Information Visualization Within Visual Representation," In Advances in and Intelligent Systems, Springer, 2009, pp. 1-20.
Zhou, Zhi Quan et al., "Metamorphic Testing of Driverless Cars," Communications of the ACM, 2019, vol. 62, No. 3, pp. 61-67.
Zhao, Zheguang et al., "Controlling False Discoveries During Interactive Data Exploration," In proceedings of the International Conference on Management of Data, ACM, 2016, pp. 527-554.
Lundgard, Alan et al., "Sociotechnical Considerations for Accessible Visualization Design," IEEE Transactions on and Computer Graphics, 2019, pp. 1-5.
Lunzer, Aran et al., "It Ain't Necessarily So: Checking Charts for Robustness," IEEE VisWeek Poster Proceedings, pp. 1-3.
Lupi, Giorgia, "Data Humanism: The Revolutionary Future of Data Visualization," Print Magazine 30, 2017, pp. 1-10.
Mackinlay, Jock et al., "Show Me: Automatic Presentation for Visual Analysis," IEEE Transactions on Visualization Computer Graphics, 2007, vol. 13, No. 6, pp. 1137-1144.
Matejka, Justin et al., "Same Stats, Different Graphs: Generating Datasets with Varied Appearance and Identical Statistics Through Simulated Annealing," In Proceedings of the 2017 CHI Conference on Human Factors in Computing Systems, ACM, 2017, pp. 1290-1294.
Mayorga, Adrian et al., "Splatterplots: Overcoming Overdraw in Scatter Plots," IEEE Transactions on Visualization Computer Graphics, 2013, vol. 19, No. 9, pp. 1526-1538.
Mayr, Eva et al., "Trust in Information Visualization," In EuroVis Workshop on Trustworthy Visualization (TrustVis), Kosara, Kai Lawonn, Lars Linsenm, and Noeska Smit (Eds.), The Eurographics Association, 2019, pp. 1-5.
Micallef, Luana et al., "Towards Perceptual Optimization of the Visual Design of Scatterplots," IEEE Transactions Visualization and Computer Graphics, 2017, vol. 23, No. 6, pp. 1-12.
Moere, Andrew Vande, "Towards Designing Persuasive Ambient Visualization," In Issues in the Design & of Ambient Information Systems Workshop, Citeseer, 2007, pp. 48-52.
Moritz, Dominik et al., "Formalizing Visualization Design Knowledge as Constraints: Actionable and Extensible in Draco," IEEE Transactions on Visualization and Computer Graphics, 2018, vol. 25, No. 1, pp. 438-448.
Newman, George E. et al., Bar graphs depicting averages are perceptually misinterpreted: The within-the-bar Psychonomic Bulletin & Review, 2012, vol. 19, No. 4, pp. 601-607.
Onuoha, Mimi, "On Missing Data Sets," https://github.com/mimionuoha/missing-datasets, Accessed: Feb. 10, 2020, pp. 1-3.
Pandey, Anshul Vikram et al., "How Deceptive are Deceptive Visualizations ?: An Empirical Analysis of Common Distortion Techniques," In Proceedings of the 33rd Annual ACM Conference on Human Factors in Ciomputing Systems, ACM, 2015, pp. 1469-1478.
Pirolli, Peter et al., "The Sensemaking Process and Leverage Points for Analyst Technology as Identified Through Cognitive Task Analysis," In Proceedings of International Conference on Intelligence Analysis, 2005, vol. 5, pp. 1-6.
Plaisant, Catherine, "Information Visualization and the Challenge of Universal Usability," In Exploring Elsevier, 2005, pp. 1-19.
Pu, Xiaoying et al., "The Garden of Forking Paths in Visualization: A Design Space for Reliable Exploratory Visual Analyics: Position Paper," In IEEE Vis: Evaluation and Beyond-Methodological Approaches for Visualization (BELIV), IEEE, 2018, pp. 37-45.
Qu, Zening et al., Keeping Multiple Views Consistent: Constraints, Validations, and Exceptions in Visualization IEEE Transactions on Visualization and Computer Graphics, 2017, vol. 24, No. 1, pp. 468-477.
Raman, Vijayshankar et al., "Potter's Wheel: An Interactive Data Cleaning System," In Proceedings of the 27th Conference on Very Large Data Bases, 2001, vol. 1, pp. 381-390.
Redmond. Stephen, "Visual Cues in Estimation of Part-To-Whole Comparisons," IEEE Transactions on Visualization and Computer Graphics, 2019, pp. 1-6.
Ritchie, Jacob et al., "A Lie Reveals the Truth: Quasimodes for Task-Aligned Data Presentation," In Proceedings of 2019 CHI Conference on human Factors in Computing Systems, ACM, 193, 2019, pp. 1-13.
Rogowitz, Bernice E. et al., The "Which Blair Project": A Quick Visual Method for Evaluating Perceptual Color in IEEE Visualization 2001, Proceedings, 2001, pp. 183-190.
Rogowitz, Bernice E. et al., "How Not to Lie with Visualization," Computers in Physics, 1996, vol. 10, No. 3, pp. 268-273.
Rosling, Hans et al., "Health advocacy with Gapminder animated statistics," Journal of Epidemiology and Global 2011, vol. 1, No. 1, pp. 11-14.
Sacha, Dominik et al., "The Role of Uncertainty, Awareness, and Trust in Visual Analytics," IEEE Transactions on Visualization and Computer Graphics, 2016, vol. 22, No. 1, pp. 240-249.
Satyanarayan, Arvind et al., "Vega-Lite: A Grammar of Interactive Graphics," IEEE Transactions on Visualization Computer Graphics, 2016, vol. 23, No. 1, pp. 341-350.
Segura, Sergio et al., "A Survey on Metamorphic Testing," IEEE Transactions on Software Engineering, 2016, 42, No. 9, pp. 805-824.
Song, Hayeong et al., "Where's My Data? Evaluating Visualizations with Missing Data," IEEE Transactions on Visualization and Computer Graphics, 2018, vol. 25, No. 1, pp. 914-924.
Srinivasan, Arjun et al., Augmenting Visualizations with Interactive Data Facts to Facilitate Interpretation and IEEE Transactions on Visualization and Computer Graphics, 2018, vol. 25, No. 1, pp. 672-681.
Stonebraker, Michael et al., "Data Curation at Scale: The Data Tamer System," In Proceedings of the 6th Biennial Conference on Innovative Data Systems Research, 2013, pp. 1-10.
Szafir, Danielle Albers, "The Good, the Bad, and the Biased: Five Ways Visualizations Can Mislead (and How Fix Them)," ACM Interactions, 2018, vol. 25, No. 4, pp. 26-33.
Tableau, "Tableau Prep," https://www.tableau.com.products/prep/ 2020, pp. 1-13.
Trifacta, "Trifacta," https://www.trifacta.com/. 2020, pp. 1-8.
Trulia, "New York Real Estate Market Overview," https://www.trulia.com/real_estate/New_York-New_York/, 2020, Feb. 11, 2020, pp. 1-3.
Valdez, Andre Calero et al., "A Framework for Studying Biases in Visualization Research," 2017, pp. 1-5.
Van Wijk, Jarke J., "The Value of Visualization," In VIS 05, IEEE Visualization, 2005, IEEE, pp. 79-86.
Vanderplas, Jacob et al., "Altair: Interactive Statistical Visualizations for Python," The Journal of Open Source 2018, vol. 3, No. 32, pp. 1-2.
Veras, Rafael et al., "Discriminability Tests for Visualization Effectiveness and Scalability," IEEE Transactions on Visualization and Computer Graphics, 2019, pp. 1-10.

(56) References Cited

OTHER PUBLICATIONS

Vickers, Paul et al., "Understanding Visualization: A Formal Foundation using Category Theory and Semiotics," Transactions on Visualization and Computer Graphics, 2012, vol. 19, No. 6, pp. 1-14.
Wainer, Howard, "How to Display Data Badly," The American Statistician, 1984, vol. 38, No. 2, pp. 137-147.
Wang, Pei et al., "Uni-Detect: A Unified Approach to Automated Error Detection in Tables," In Proceedings of the International Conference on Management of Data, ACM, 2019, pp. 811-828.
Whitworth, Brian, "Polite Computing," Behaviour & Information Technology, 2005, vol. 24, No. 5, pp. 353-363.
Wood, Jo et al., "Design Exposition with Literate Visualization," IEEE Transactions on Visualization and Computer 2018, vol. 25, No. 1, pp. 759-768.
Vvu, Eugene et al., "Scorpion: Explaining Away Outliers in Aggregate Queries," Proceedings of the VLDB 2013, vol. 6, No. 8, pp. 553-564.
Xiong, Cindy et al., "Illusion of Causality in Visualized Data," arXiv preprint arXiv:1908.00215, 2019, pp. 1-10.
Xiong, Cindy et al., "The Curse of Knowledge in Visual Data Communication," IEEE Tranactions on Visualization Computer Graphics, 2019, pp. 1-1.
Zgraggen, Emanuel et al., "Investigating the Effect of the Multiple Comparisons Problem in Visual Analysis," In of the 2018 CHI Conference on Human Factors in Computing Systems, ACM, 2018, pp. 1-12.
International Search Report and Written Opinion for International Patent Application No. PCT/US2020/050722 mailed 24, 2020, pp. 1-6.
Arai, Taichi et al., "Preventing the creation of misleading graphs, Targeted learning tool," IPSJ SIG Technical Report, vol. 2018-GN-104, No. 4, ISSN 2188-8744, Mar. 2018, pp. 1-17.
Office Communication for U.S. Appl. No. 17/014,882 mailed Apr. 27, 2021, pp. 1-27.
Office Communication for U.S. Appl. No. 16/732,027 mailed Jun. 14, 2021, pp. 1-22.
Office Communication for U.S. Appl. No. 16/915,963 mailed Jul. 19, 2021, pp. 1-9.
Office Communication for U.S. Appl. No. 16/903,967 mailed Sep. 27, 2021, pp. 1-16.
Office Communication for U.S. Appl. No. 17/014,882 mailed Nov. 2, 2021, pp. 1-33.
International Search Report and Written Opinion for International Patent Application No. PCT/US2021/043167 mailed 26, 2021, pp. 1-7.
International Search Report and Written Opinion for International Patent Application No. PCT/US2021/043177 mailed 26, 2021, pp. 1-8.
Office Communication for U.S. Appl. No. 16/732,027 mailed Nov. 15, 2021, pp. 1-25.
International Search Report and Written Opinion for International Patent Application No. PCT/US2021/049229 mailed 16, 2021, pp. 1-8.
Office Communication for U.S. Appl. No. 16/944,064 mailed Nov. 26, 2021, pp. 1-50.
Office Communication for U.S. Appl. No. 16/672,130 mailed Jan. 5, 2022, pp. 1-32.
Office Communication for U.S. Appl. No. 16/915,963 mailed Jan. 7, 2022, pp. 1-9.
Office Communication for U.S. Appl. No. 17/014,882 mailed Jan. 25, 2022, pp. 1-6.
Vvu, Aoyu et al., "MultiVision: Designing Analytical Dashboards with Deep Learning Based Recommendation," IEEE, preprint, arXiv:2107.07823, Jul. 2021, pp. 1-11.
Shi, Danqing et al., "Talk2Data: High-Level Question Decomposition for Data-Oriented Question and Answering," preprint, arXiv:2107.14420, Jul. 2021, pp. 1-11.
Wang, Yun et al., "DataShot: Automatic Generation of Fact Sheets from Tabular Data," IEEE Transactions on and Computer Graphics, vol. 26, No. 1, Aug. 2019, pp. 1-11.
Wang Baldonado, Michelle Q. et al., "Guidelines for Using Multiple Views in Information Visualization," AVI '00, Proceedings of the Working Conference on Advanced Visual Interfaces, May 2000, pp. 1-10.
Chen, Xi et al., "Composition and Configuration Patterns in Multiple-View Visualizations," arXiv preprint, Aug. 2020, pp. 1-11.
Crisan, Anamaria et al., "GEViTRec: Data Reconnaissance Through Recommendation Using a Domain-Specific Visualization Prevalence Design Space," IEEE Transactions on Visualization and Computer Graphics, TVCG Submission, Jul. 2021, pp. 1-18.
Office Communication for U.S. Appl. No. 16/732,027 mailed Feb. 25, 2022, pp. 1-6.
Office Communication for U.S. Appl. No. 16/944,085 mailed Mar. 17, 2022, pp. 1-6.
Office Communication for U.S. Appl. No. 16/903,967 mailed Mar. 18, 2022, pp. 1-11.
Office Communication for U.S. Appl. No. 16/944,064 mailed Mar. 22, 2022, pp. 1-10.
Office Communication for U.S. Appl. No. 16/915,963 mailed Mar. 23, 2022, pp. 1-4.
International Search Report and Written Opinion for International Patent Application No. PCT/US2022/012907 mailed 16, 2022, pp. 1-13.
Office Communication for U.S. Appl. No. 16/915,963 mailed Apr. 26, 2022, pp. 1-9.
Office Communication for U.S. Appl. No. 16/672,130 mailed May 19, 2022, pp. 1-33.
Office Communication for U.S. Appl. No. 17/014,882 mailed Jun. 9, 2022, pp. 1-8.
Office Communication for U.S. Appl. No. 16/732,027 mailed Jun. 14, 2022, pp. 1-18.
Office Communication for U.S. Appl. No. 17/158,911 mailed Jun. 28, 2022, pp. 1-29.

\* cited by examiner

INTERACTIVE INTERFACE FOR DATA ANALYSIS AND REPORT GENERATION

CROSS-REFERENCE TO RELATED APPLICATION(S)

This application is a continuation of U.S. patent application Ser. No. 17/866,091, filed on Jul. 15, 2022, titled "Interactive Interface for Data Analysis and Report Generation," which is a Continuation of U.S. patent application Ser. No. 16/944,064 filed on Jul. 30, 2020, now U.S. Pat. No. 11,397,746 issued on Jul. 26, 2022, the benefit of which is claimed under 35 U.S.C. § 120, and the contents of which is further incorporated in entirety by reference.

TECHNICAL FIELD

The present invention relates generally to data analysis, and more particularly, but not exclusively to, interactive data analysis.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data may enable organizations to improve their understanding of critical business operations and help them monitor key performance indicators. However, in some cases, skilled or specialized data analysts may be required to discover insights to from visualizations and data that may be value to organizations. Further, in some cases, the sheer number of visualizations or the amount of data may make it difficult to discover visualizations that may share useful commonalities. Further, in some cases, difficulties associated with consolidating information from disparate sources or from many visualizations may interfere with efficient generation of reports that capture the insights discovered during data analysis Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
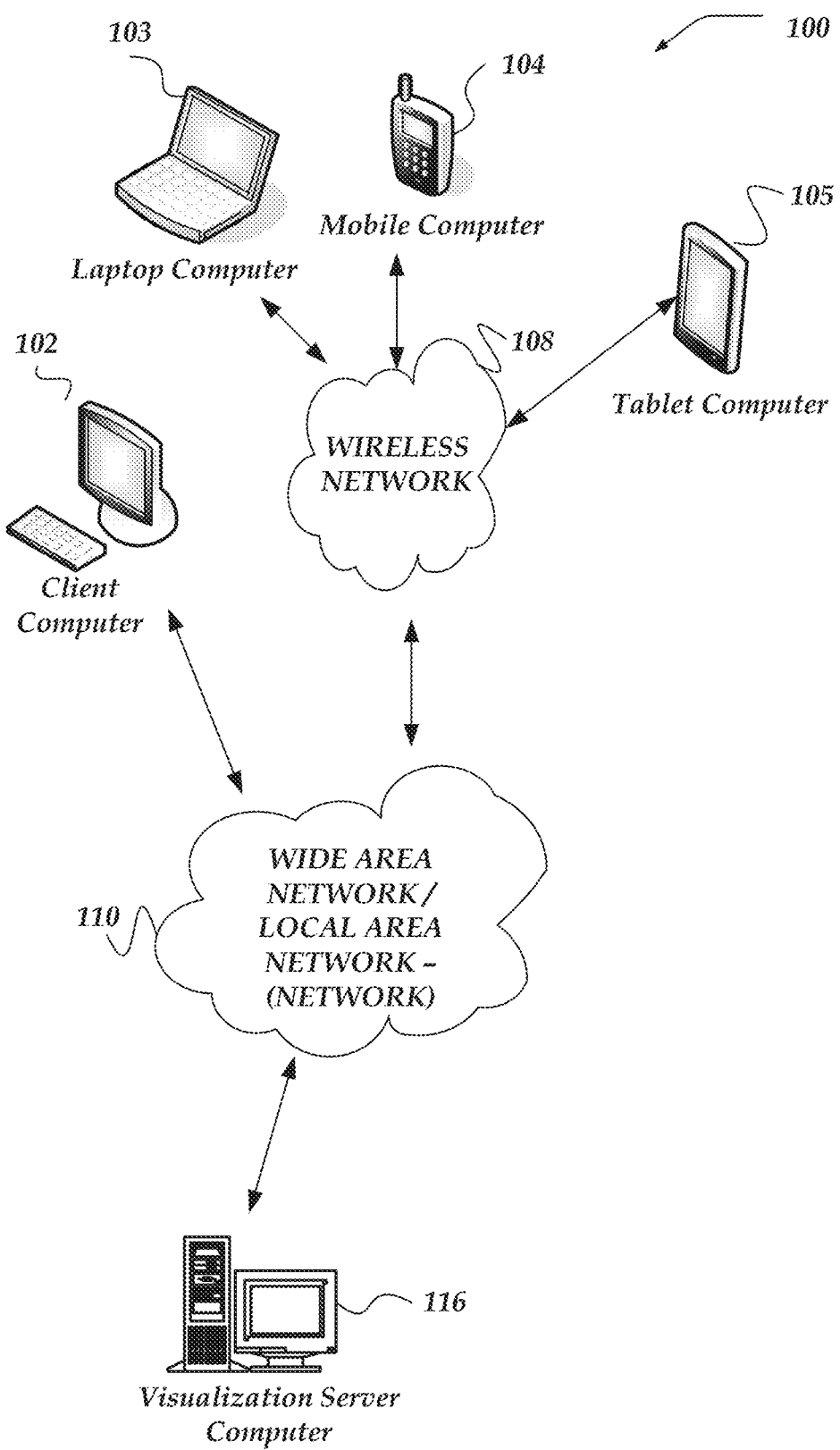
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to the source of the underlying information that is being modeled or otherwise analyzed. Data sources may include information from or provided by databases (e.g., relational, graph-based, no-sql, or the like), file systems, unstructured data, streams, or the like. Data sources are typically arranged to model, record, or memorialize various operations or activities associated with an organization. In some cases, data sources are arranged to provide or facilitate various data-focused actions, such as, efficient storage, queries, indexing, data exchange, search, updates, or the like. Generally, a data source may be arranged to provide features related to data manipulation or data management rather than providing an easy to understand presentation or visualization of the data.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein, the term "data model field" refers to named or nameable properties or features of a data model. Data model fields are analogous to columns in a database tables, nodes in a graph, Java class attributes, and so on. For example, a data model that corresponds to an employee database table, may have data model fields, such as, name, email-address, telephone-number, employee-id, or the like.

As used herein the term "data object" refers to one or more entities or data structures that comprise data models. In some cases, data objects may be considered portions of the data model. Data objects may represent individual instances of items or classes or kinds of items.

As used herein the term "data field" refers to a named or nameable property or attribute of a data object. In some cases, data fields may be considered analogous to class members of an object in object oriented programming.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing visualizations of data using one or more processors that execute one or more instructions to perform action as described herein. In one or more of the various embodiments, a primary visualization that is associated with a data model may be provided such that the primary visualization may be displayed in a display panel.

In one or more of the various embodiments, one or more insight items may be generated based on the primary visualization and the data model such that the one or more insight items may correspond to one or more visualizations that may share one or more portions of the data model and such that the one or more insight items may be displayed in an insight panel.

In one or more of the various embodiments, generating the one or more insight items may include: providing one or more assessment models that may be arranged to identify the one or more visualization items; employing the one or more assessment models to generate one or more candidate insight items based on the one or more visualization such that the one or more candidate insight items may be associated with an insight score; determining the one or more insight items based on a portion of the one or more candidate insight items that may be associated with an insight score that exceeds a threshold value; or the like.

Also, in one or more of the various embodiments, generating the one or more insight items may include: determining a first set of one or more visualizations based on each of the first set of one or more visualizations including one or more data fields that may be used in the primary visualization; determining a second set of one or more visualizations based on each of the second set of one or more visualizations showing value trends for the one or more data fields that may be used in the primary visualization; determining a third set of one or more visualizations based on each of the third set of one or more visualizations using one or more other data fields from other data models that include data values that are similar to the one or more data fields used in the primary visualization; or the like. And, in one or more of the various embodiments, generating the one or more insight items based on one or more of the first set of one or more visualizations, the second set of one or more visualizations, the third set of one or more visualizations, or the like.

In one or more of the various embodiments, displaying the one or more insight items in the insight panel may include: determining one or more insight item groups based on a type of assessment model that identifies the one or more insight items such that each insight item may be associated with an insight item group; displaying each insight item group in the insight panel such that each insight item may be displayed with its associated insight item group; or the like.

In one or more of the various embodiments, in response to an insight item being selected from the insight panel, additional actions may be performed, including: generating a visualization based on the insight item that is displayed in the display panel instead of the primary visualization; generating a scratch item that includes a thumbnail view of the primary visualization such that the thumbnail view may be displayed in a scratch panel; or the like.

In one or more of the various embodiments, in response to selecting one or more of another insight item from the insight panel or another scratch item from the scratch panel, another visualization may be generated based on the selection of one or more of the other insight item or the other scratch item such that the other visualization is displayed in the display panel instead of a currently displayed visualization.

In one or more of the various embodiments, a report panel that replaces the display of the display panel may be provided. And, in some embodiments, in response to selecting one or more of the one or more insight items, one or more scratch items, or one or more annotations further actions may be performed, including: generating one or more report items based on the one or more of the one or more insight items, the one or more scratch items, the one or more annotations, or the like, such that the one or more annotations include one or more of text, images, links to other reports, or the like, and such that the one or more report items may be displayed in the report panel; automatically resizing the report panel to a size that may be based on the one or more report items such that the portion of the report panel that exceeds the size of the display panel may be hidden from view; or the like.

In one or more of the various embodiments, in response to replacing the visualization in the display panel with a replacement visualization, one or more replacement insight items may be generated based on the replacement visualization and the data model such that the one or more replacement insight items may be displayed in the insight panel.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 or the like, as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
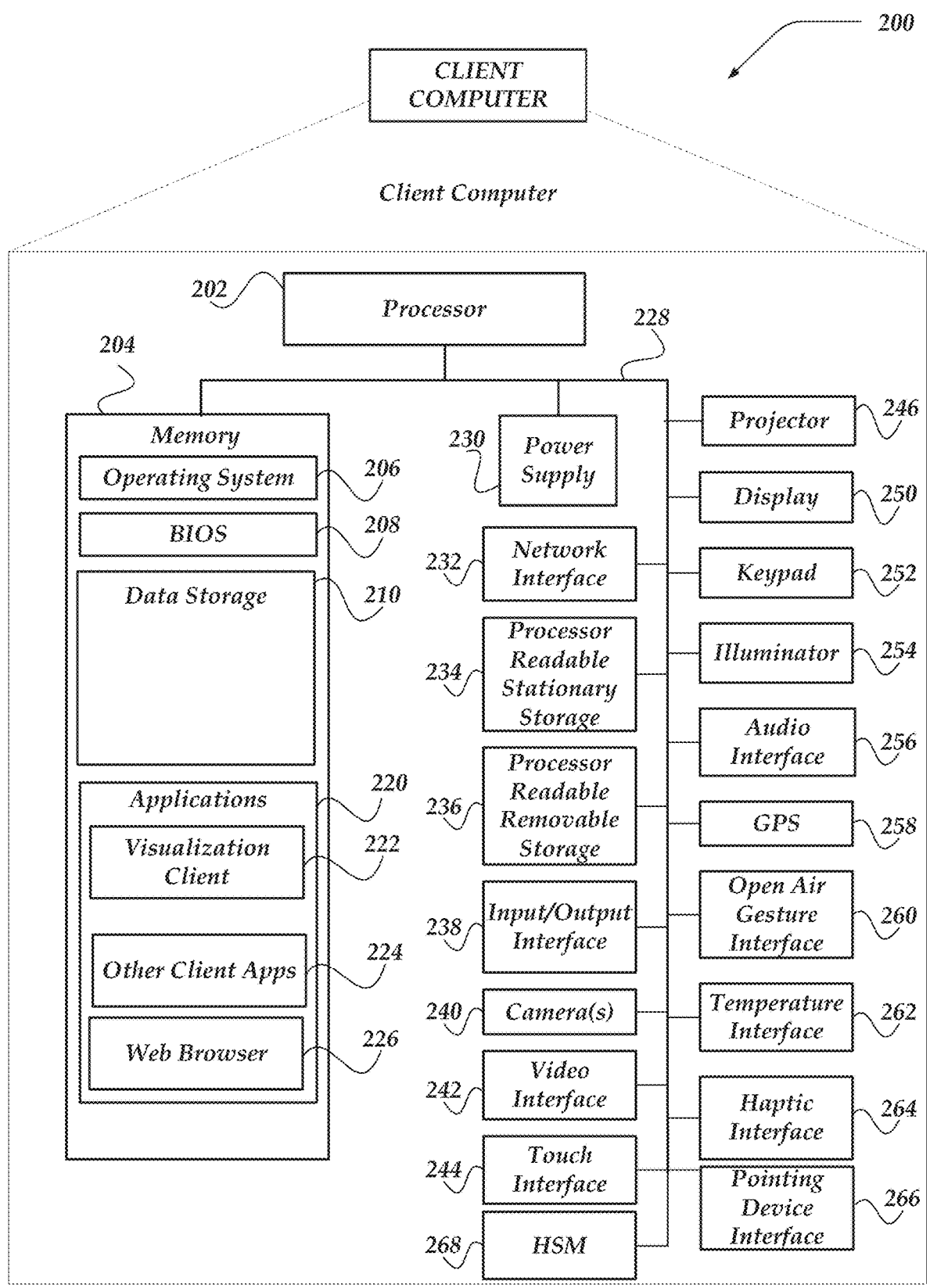
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, visualization client 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Android™, or the iOS operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, visualization client 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
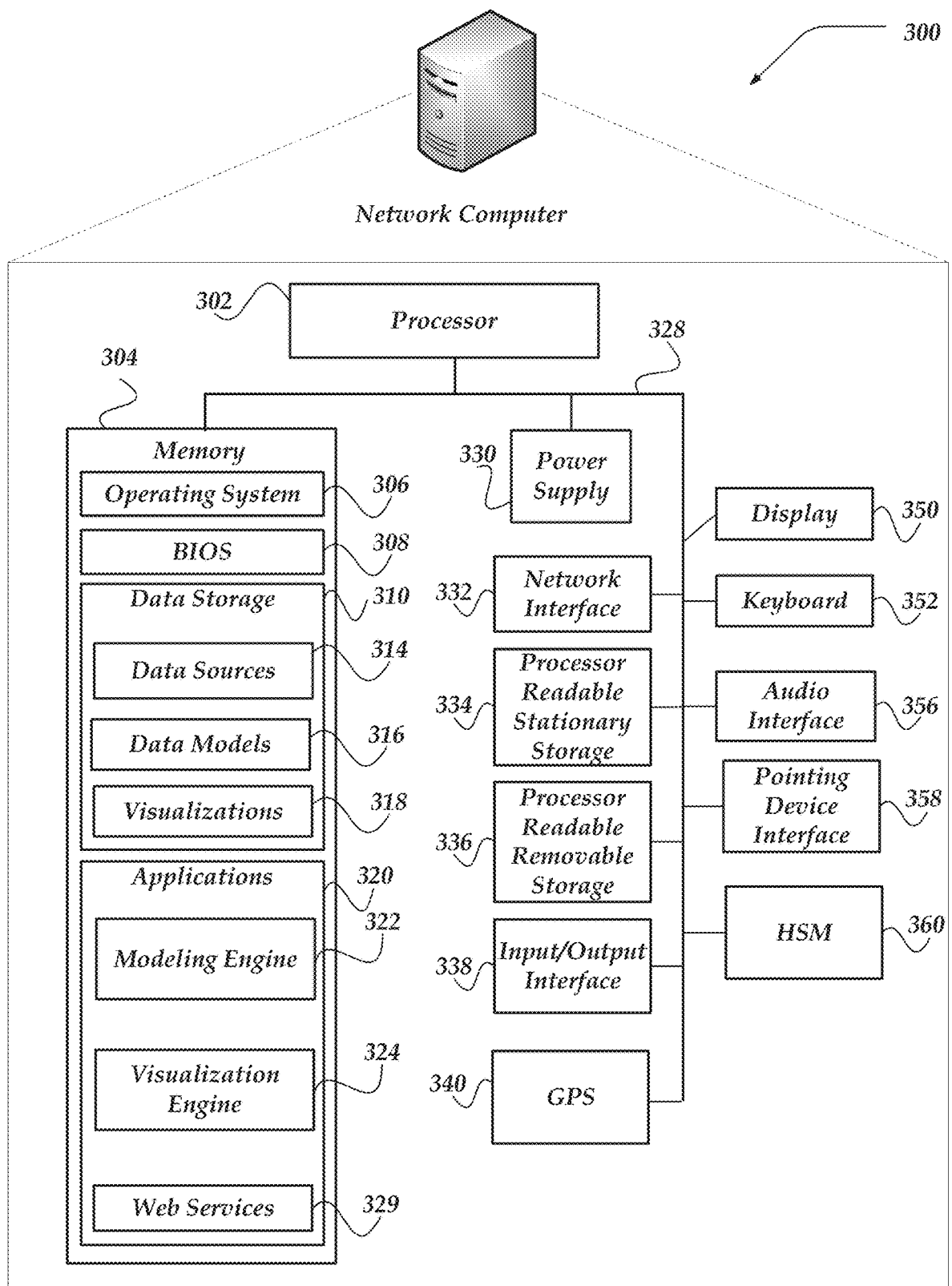
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of event analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, visualization engine 324, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, data models 316, visualizations 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, visualization engine 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, visualization engine 324, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, visualization engine 324, other applications 329, or the like, may be provisioned and de-commissioned automatically.

Also, in one or more of the various embodiments, modeling engine 322, visualization engine 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
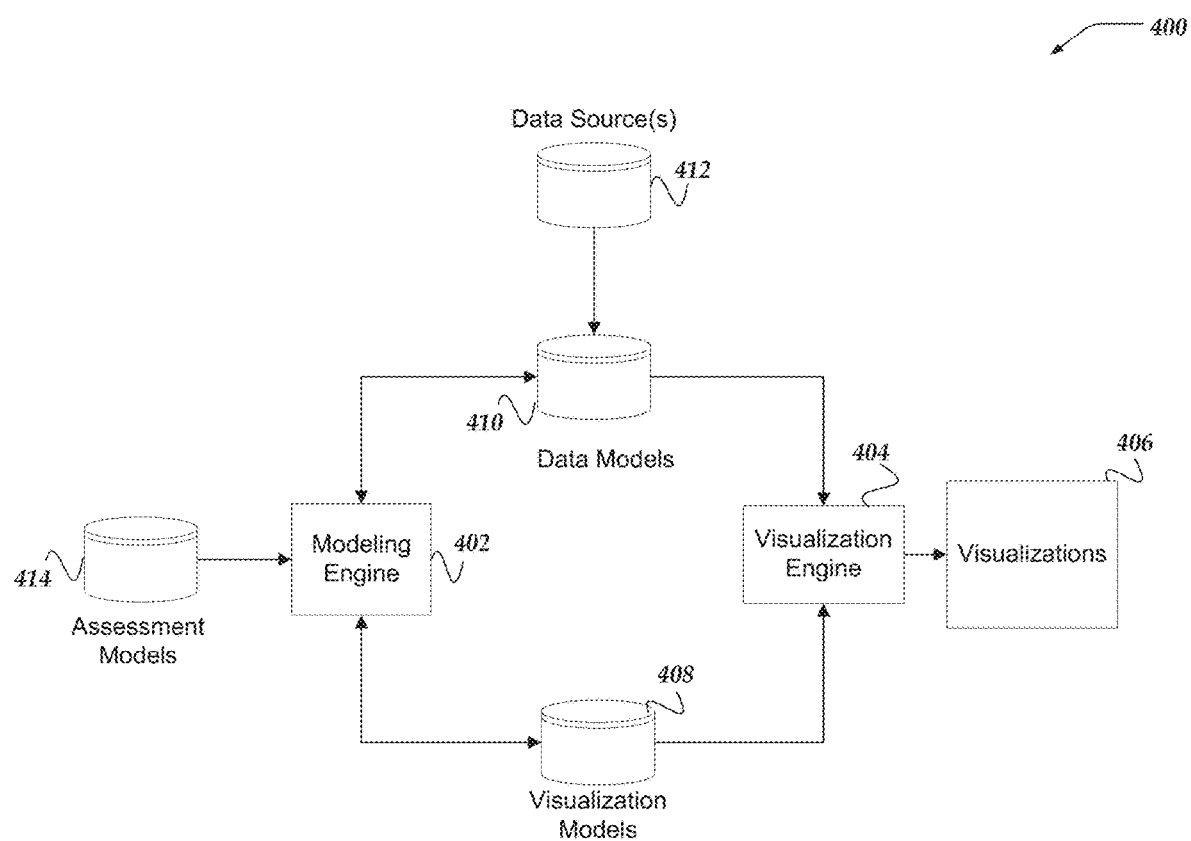
FIG. 4 illustrates a logical architecture of a system for interactive interface for data analysis and report generation in accordance with one or more of the various embodiments.

FIG. 4 illustrates a logical architecture of system 400 for interactive interface for data analysis and report generation in accordance with one or more of the various embodiments. In one or more of the various embodiments, system 400 may be a data modeling platform arranged to include various components including: modeling engine 402; visualization engine 404; visualizations 406; visualization models 408; data models 410; data sources 412; assessment models 414; or the like.

In one or more of the various embodiments, data sources 412 represent a source of raw data, records, data items, or the like, that modeling engine 402 may employ to enable users to generate or modify data models, such as, data models 410.

In one or more of the various embodiments, data models, such as, data models 410 may be data structures, or the like, that provide one or more logical representations of the information stored in one or more data sources, such as, data source 412. In some embodiments, data models may include data objects that correspond to one or more portions of tables, views, or files in a data source. For example, in some embodiments, if data source 412 is a CSV file or a database, a data model, such as, data model 412 may be comprised of one or more data objects that may correspond to record fields in data source 412.

In one or more of the various embodiments, data models may be arranged to provide logical representations of a data source that may vary from an underlying data source. In some embodiments, this may include excluding one or more fields of the data source from the data model.

In some embodiments, a modeling engine, such as, modeling engine 402 may be employed to transform some or all of data sources 412 into data models 410. In some embodiments, the modeling engine may be arranged to employ or execute computer readable instructions provided by configuration information to determine some or all of the steps for transforming values in data sources into data models. In one or more of the various embodiments, modeling engines may be arranged to enable interactive interface for data analysis and report generation, as described in detail below.

In one or more of the various embodiments, visualization engines, such as, visualization engine 404 may be arranged to employ visualization models, such as, visualization models 408 to determine the layout, styling, interactivity, or the like, for visualizations, such as, visualizations 406 that may be displayed to users. Also, in some embodiments, visualization engines may be arranged to employ data item values provided via data sources to populate visualizations with values based on a data model.

In one or more of the various embodiments, modeling engines may be arranged to enable users to select a primary visualization that may provide a starting point for an analysis session. Accordingly, in one or more of the various embodiments, modeling engines may be arranged to determine one or more insight items that may provide analytical information related to the visualization or its associated data models or data sources.

In one or more of the various embodiments, modeling engines may be arranged to employ one or more assessment models, such as, assessment models 414 to evaluate data fields, data models, data sources, visualizations, or the like, to determine one or more insight items that may be associated with a primary visualization.

In one or more of the various embodiments, different assessment models may be arranged to provide insight scores that may be used to compare the rank insight items. In some embodiments, different assessment models may be configured employ different scoring criteria for determining or scoring insight items. Accordingly, in some embodiments, assessment engines may be arranged to weight or normalize insight scores provided by different assessment models. In some embodiments, the particular normalization rules or weight rules for normalizing or weighting assessment model confidence scores may be provided via configuration information.

Also, in one or more of the various embodiments, assessment models may be arranged to provide natural language narratives that may be employed in user interfaces or reports explain the meaning or context of an insight item. In some embodiments, narratives may be based on templates that enable labels, units, values, field names, or the like, associated with insight items or visualizations to be included with the insight items listed in the insight panel.

In one or more of the various embodiments, assessment models may be designed or tailored to evaluate one or more statistical features of data associated with a visualization. Accordingly, in one or more of the various embodiments, modeling engines may be arranged to apply one or more assessment models to assess if the data associated with a visualization has one or more of the statistical features targeted by an assessment model. In some embodiments, assessment models may be arranged to provide the insight score as a form of a self-grade that represents how close the data associated with the insight items matches the statistical features the assessment model may be designed to match or otherwise evaluate.

In one or more of the various embodiments, one or more assessment models may focus on general, well-known, or commonplace statistical features that may be expected to be associated with visualizations, marks, data models, data sources, or the like.

Also, in one or more of the various embodiments, one or more assessment models may be customized or directed to particular problem domains or business domains. For example, assessment models directed to financial information may be arranged differently than assessment models directed to employee information. Likewise, for example, assessment models directed to the automobile industry may be arranged differently than assessment models directed to the cruise (ship) industry. Further, in one or more of the various embodiments, one or more assessment models may be customized for particular data sources, data models, or visualizations for a particular organization or user. Accordingly, in one or more of the various embodiments, assessment models may be stored in data store that enables them to be configured independently from each other.

In one or more of the various embodiments, if a user provides a primary visualization, the modeling engine may determine one or more assessment models and apply them to determine insight items that may be associated with the primary visualization. In some embodiments, insight items may be grouped based on the assessment models used to identify them. Also, in some embodiments, one or more insight items may be grouped because they represent the same kind of insight. In some embodiments, modeling engines may be arranged to determine insight items grouping rules based on configuration information.

In one or more of the various embodiments, assessment models may be arranged to determine insights related to determining outlier values, trends, aggregates, related visualizations, related data model, or the like, based on the features of the primary visualization, its data source, its data model, or the like. Further, in one or more of the various embodiments, modeling engines may be arranged to automatically provide visualizations that correspond to some or all of the insight items. For example, if the trend of a Profit data field is determined to be an insight item, the modeling engine may provide a visualization showing the trend line for the Profile data field. In some embodiments, modeling engines may be arranged to generate thumbnails views for the insight items that appear similar to the related insight visualization.

In one or more of the various embodiments, modeling engines or visualization engines may be arranged to track or log metrics associated with system-wide user interactions with visualizations or data models. Accordingly, in one or more of the various embodiments, one or more assessment models may be arranged to identify other visualizations that may commonly be viewed close-in-time to the primary visualization. In some embodiments, some of these visualizations may be determined to be related visualizations that merit being considered an insight item. Note, in some embodiments, the particular criteria for determining if visualizations are related, or if related visualizations may be insight items may be determined based on the particular assessment models employed to determine such insight items. Likewise, in some embodiments, modeling engines may be arranged to employ one or more assessment models to determine one or more related data fields that may comprise one or more data models or one or more data sources shared by the primary visualization and other visualizations. For example, an assessment model may be arranged to determine that one or more visualizations that use some of the same data fields as the primary visualization may be considered insight items. In some embodiments, assessment models may be configured to provide the particular criteria for determining if visualizations that share data fields, data models, or the like, may be considered insight items.

Further, in some embodiments, modeling engines may be arranged to provide a scratch pad (e.g., scratch panel) that enables a user to selectively capture or record visualizations or insight items during the analysis session. In some embodiments, the scratch panel may be configured to display the captured information (e.g., scratch items) in a chronological order to provide visual cues regarding the progression of the analysis session. Also, in some embodiments, scratch items in the scratch panel may be accessed out of order to enable user to dynamically view the visualizations, or the like, associated with the scratch items.

Figure 5A:
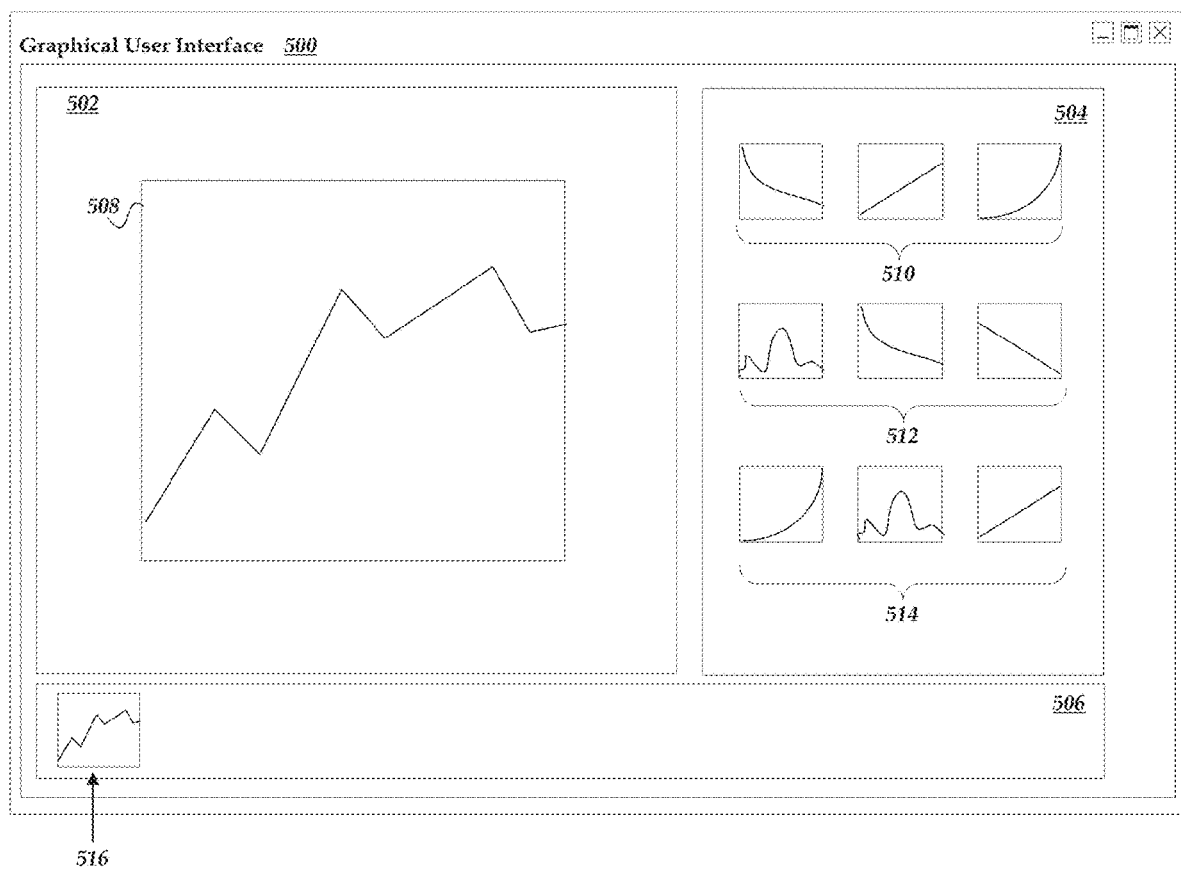
FIG. 5A illustrates a logical representation of a portion of a user interface for interactive interface for data analysis and report generation in accordance with one or more of the various embodiments.

FIG. 5A illustrates a logical representation of a portion of user interface 500 for interactive interface for data analysis and report generation in accordance with one or more of the various embodiments. In some embodiments, user interface 500 may be arranged to include one or more panels, such as, display panel 502, insights panel 504, scratch panel 506, or the like.

In one or more of the various embodiments, user interface 500 may be displayed on one or more hardware displays, such as, client computer displays, mobile device displays, or the like. In some embodiments, user interface 500 may be provided via a native application or as a web application hosted in a web browser or other similar applications. One of ordinary skill in the art will appreciate that for at least clarity or brevity many details common to commercial/production user interfaces have been omitted from user interface 500. Likewise, in some embodiments, user interfaces may be arranged differently than shown depending on local circumstances or local requirements, such as, display type, display resolution, user preferences, or the like. However, one of ordinary skill in the art will appreciate that the disclosure/description of user interface 500 is at least sufficient for disclosing the innovations included herein.

In one or more of the various embodiments, modeling engines may be arranged to generate user interfaces such as user interface 500 for interactive data analysis or report generation.

In this example, display panel 502 represent a panel for displaying visualizations that have been selected or recommended a user. In some embodiments, the user may be an author of the displayed visualization or the user may be performing data analysis using visualizations authored by other users. In some embodiments, display panels, such as, display panel 502 may be employed to display different visualizations. For example, if a user selects a visualization to review, it may be displayed in a display panel. In some embodiments, visualizations displayed in display panels may be comprised of one or more sub-visualizations, user interface controls, text annotations, or the like. However, for at least brevity and clarity visualizations, such as, visualization 508 may be considered to represent more complex visualizations as well as simple visualizations.

In one or more of the various embodiments, visualizations may be associated with one or more data sources that provide the data may be represented by the visualization. In this example, visualization 508 represents a line plot. One of ordinary skill in the art will appreciate the other graphical plots or visualizations may be employed without departing from the innovations disclosed herein. Further, in some embodiments, the data domain or semantic meaning of the visualizations described herein may vary depending on the needs of the users or organizations that may be authoring visualizations. Thus, herein there is little discussion of the underlying data, the meaning of particular visualizations or plot, or the like.

In one or more of the various embodiments, modeling engines may be arranged to generate insight panels, such as, insight panel 504. In some embodiments, insight panels may be arranged to display interactive representations of one or more insight items. In one or more of the various embodiments, insight items may represent various visualizations, or the like, that may provide some analytical insights to a user that may be viewing one or more visualizations. Accordingly, in some embodiments, if a user selects a primary visualization to analyze, modeling engines may be arranged to determine one or more insight items based on one or more of, the characteristics of the primary visualization, data models associated with the primary visualization, data sources associated with primary visualization, or the like. In this example, for some embodiments, visualization 508 may be considered a primary visualization.

In one or more of the various embodiments, users may be enabled to select one or more insight items which may cause a visualization associated with the selected insight items to be displayed in the display panel—replacing the last primary visualization. Accordingly, in some embodiments, users may rapidly switch to view visualizations that may be listed in the insight panel. Also, in some embodiments, as different visualizations are selected, they may become the current primary visualization. Thus, in some embodiments, modeling engines may be arranged to modify the collection of insight items based on the current primary visualization.

In one or more of the various embodiments, modeling engines may be arranged to scratch pad panels (e.g., scratch panels), such as, scratch panel 506. In some embodiments, modeling engines may be arranged to associate references to one or more visualizations or insight items in scratch panels. In one or more of the various embodiments, modeling engines may be configured to display scratch panel items, such as, scratch panel item 516 in scratch panels, such as, scratch panels. In some embodiments, modeling engines may be arranged to automatically generate scratch panel items as users switch to different primary visualizations. Likewise, in one or more of the various embodiments, modeling engines may be arranged to provide various user interface controls or menu items that enable users to select add or remove scratch panel items from scratch panels.

In one or more of the various embodiments, modeling engines may be arranged to generate scratch panel items that provide a visual record of one or more of the visualizations or one or more of the insight items reviewed by the user. Accordingly, in some embodiments, a record of the data analysis session may be generated and displayed in the display panel.

In some embodiments, as users select scratch panel items, visualizations associated with the selected scratch panel items may be displayed in the display panel, becoming the current primary visualization.

In one or more of the various embodiments, modeling engines may be arranged to enable users to remove scratch panel items from the scratch panel. For example, in some embodiments, user interface controls, such as, context menus, buttons, o the like, may be provided to remove scratch panel items from the scratch panel. Similarly, in some embodiments, users may be enabled to select if a primary visualization or insight item should be added to the scratch panel. In one or more of the various embodiments, modeling engines may be arranged to employ templates, layout information, styling information, or the like, provided via configuration information to determine the appearance or interactive behavior of scratch panels.

In one or more of the various embodiments, modeling engines may be arranged to display different types of insight items in insight panels. In some embodiments, the different types of insight items may be grouped or otherwise styled to indicate they are in the same group. In some embodiments, modeling engines may be arranged to display icons, labels, text descriptions, tooltips, or the like, to provide context information about a group of insight items.

In this example, insight panel 504 represents an insight panel that is showing three different types of insight items. In this example, insight item group 510, insight item group 512, and insight item group 514 represent different insight item groups. In some embodiments, the numbers of insight items in an insight item group and the number of insight item groups may vary depending one or more factors, including, the current primary visualization, the data sources associated with the primary visualization, the data models associated with the primary visualization, or the like. In some embodiments, modeling engines may be arranged to employ rules, catalogs, instructions, or the like, provided via configuration information to determine the particular arrangement or selection of insight item group that may be displayed in an insight panel to account for local requirements or local circumstances.

Similarly, in one or more of the various embodiments, modeling engines may be arranged to employ templates, layout information, styling information, or the like provided via configuration information to determine the appearance or interactive behavior of the insight panel.

In one or more of the various embodiments, insight items may be determined based on a variety of criteria depending on the type of insight item. In some embodiments, insight items may be associated with other visualizations that have one or more characteristics that may be similar to the primary visualization. For example, in some embodiments, insight items may be other visualizations that are based on the same data model or data source as the primary visualization. In other cases, insight items may be visualizations that are focused on data fields that may or may not be displayed in the primary visualization. For example, if the primary visualization shows a current value of a data field, an insight item may be another visualization that shows the rate of change for the same field. Other examples may include visualizations that show trends, distributions, or the like, that may be related to data fields included in the primary visualization. In some cases, insight items may be different visualizations of same data as the primary visualization that may be made by different authors. Also, in some embodiments, insight items may represent visualizations or explanations (text) that focus on data fields that may be influencing or driving the appearance of the primary visualization. For example, this may include highlighting outliers, missing values, or the like.

Accordingly, in one or more of the various embodiments, modeling engines may be arranged to employ a variety of assessment models (not shown) to determine insight items. In one or more of the various embodiments, assessment models may be considered data structures that include the data or instructions for determining if visualizations, data fields, data models, explanations, or the like, should be listed in the insight panel. In one or more of the various embodiments, assessment models may be provided from a variety of sources and may include, heuristics, grammars, parsers, conditionals, machine learning classifiers, other machine learning models, curve fitting, or the like, that may be employ to provide an insight score that may be used to determine if the item under consideration may be listed in the insight panel. In some embodiments, modeling engines may be arranged to employ insight scores provided by assessment models to determine if an insight item should be listed. In some embodiments, modeling engines may be arranged to apply additional criteria, such as, the age of insight items, number of other users that have viewed or used an insight item, or the like.

In one or more of the various embodiments, modeling engines may be arranged to enable one or more assessment models to added or removed from the system. Thus, in some embodiments, as new kinds of insight items may be determined, assessment models that may discover them may be included. Likewise, if assessment models fall out of favor based on local preferences or local requirements, those assessment models may be removed or otherwise disabled. Accordingly, in some embodiments, modeling engines may be arranged to determine the available assessment models based on configuration information to account for local circumstances of local requirements.

In one or more of the various embodiments, modeling engines may be arranged to apply one or more sorting functions to rank order insight items within their group or against all insight items. In some embodiments, the sorting functions may vary depending on the insight item group, the user, the organization, or the like. Also, in some embodiments, users or organizations may be enabled to define one or more sorting rules, or the like, that may be stored as preferences in configuration information.

In one or more of the various embodiments, additional panels may be included in user interface 500, including, panels or control for providing search expressions, filters, or the like.

Figure 5B:
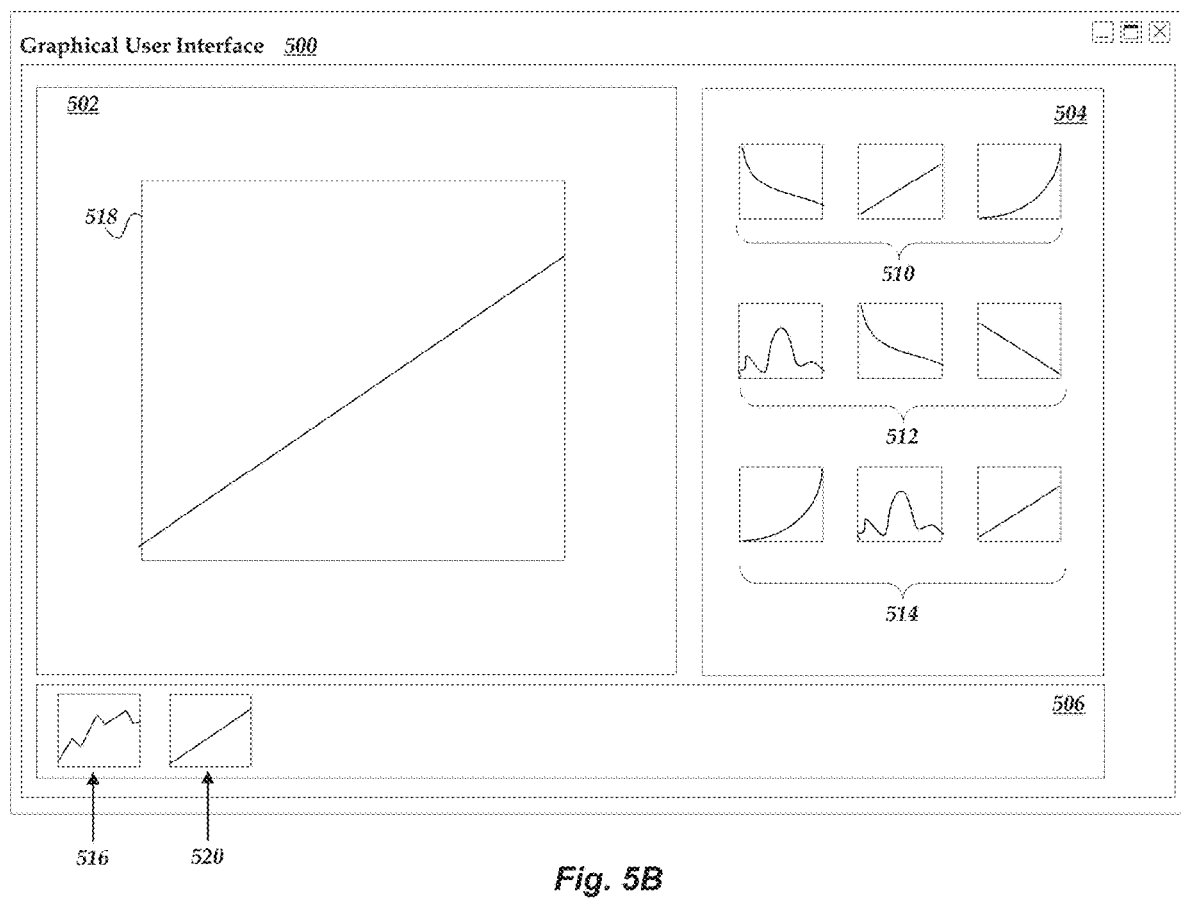
FIG. 5B illustrates a logical representation of a portion of a user interface for interactive interface for data analysis and report generation in accordance with one or more of the various embodiments.

FIG. 5B illustrates a logical representation of a portion of user interface 500 for interactive interface for data analysis and report generation in accordance with one or more of the various embodiments. For brevity and clarity, elements or behaviors of user interface 500 described above for FIG. 5A are not repeated here.

In this example, the primary visualization has changed to primary visualization 518 which represents a visualization generated based on an insight item selected from insight panel 504. Also, in this example, scratch panel item 520 may be considered to reference primary visualization 518.

In this example, a user has added two scratch panel items (scratch panel item 516 and scratch panel item 52) to scratch panel 506. Accordingly, in some embodiments, if the user wants to revisit the visualization associated with scratch panel item 516, they may select scratch panel item 516 and the modeling engine may display the corresponding visualization as the current primary visualization. Note, in some embodiments, if the visualization correspond to scratch panel item 516 is selected to be the primary visualization, the two scratch panel items in scratch panel 506 may remain displayed.

In one or more of the various embodiments, modeling engines may be arranged to enable users to change the order of the scratch panel item in scratch panel. For example, a modeling engine may be arranged to generate scratch panels such that the positions of scratch panel items may be changed by dragging them to another position in the scratch panel.

Figure 6:
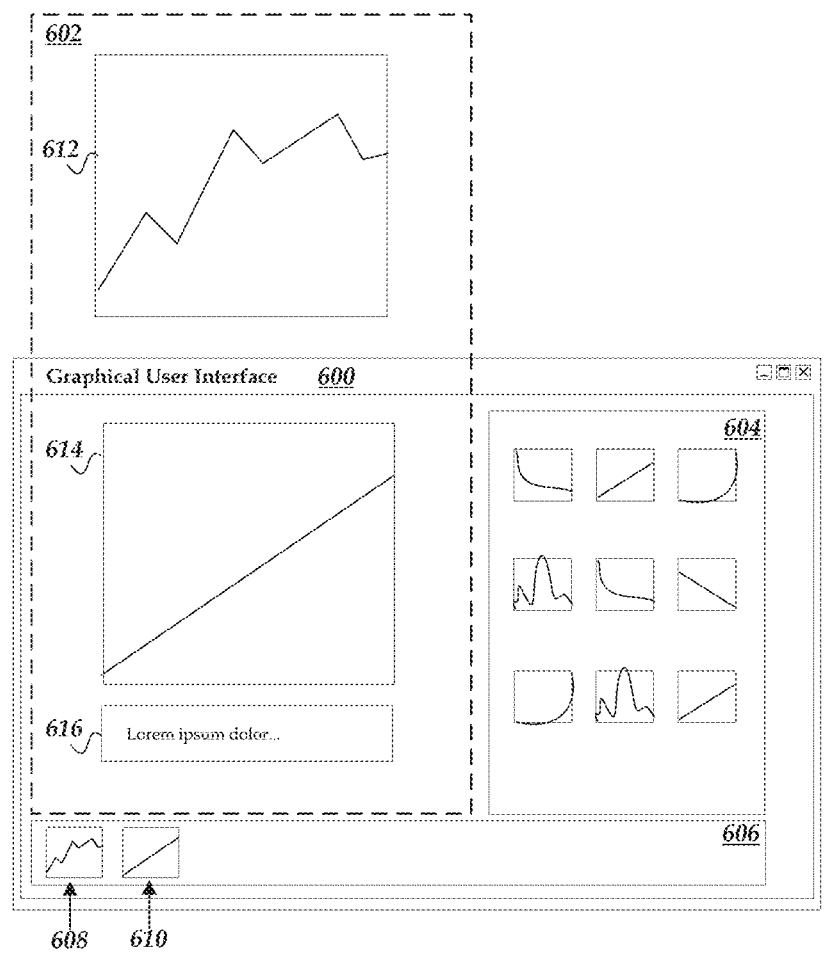
FIG. 6 illustrates a logical representation of a portion of a user interface for interactive interface for data analysis and report generation in accordance with one or more of the various embodiments.

FIG. 6 illustrates a logical representation of a portion of user interface 600 for interactive interface for data analysis and report generation in accordance with one or more of the various embodiments. For reasons of brevity and clarity, elements or behaviors of user interface 600 described above for FIG. 5A, or the like, are not repeated here.

In some embodiments, user interfaces, such as, user interface 600 may be arranged to include a story panel, such as, story panel 602, insight panel 604, scratch panel 606, or the like.

In one or more of the various embodiments, modeling engines may be arranged to enable users to generate reports that may be saved or shared with other users. In some embodiments, reports may be considered compound visualizations that include one or more visualizations, additional annotations, or the like.

In one or more of the various embodiments, modeling engines may be arranged to enable story items to be added a story panel. In one or more of the various embodiments, story items may be selected from a scratch panel or an insight panel. Or, in some embodiments, story items may include additional annotations that may be added or created on the fly. In some embodiments, modeling engines may be arranged to generate interaction reports based on the story items that may be added to the story panel.

In this example, visualization 612 and visualization 614 represent visualizations that have been added to the story panel. In this example, for some embodiments, visualization 612 may be added to story panel 602 based on a user interacting with scratch panel item 608. Similarly, in this example, visualization 614 may be added to story panel 602 based on the user interacting with scratch panel item 610.

In one or more of the various embodiments, modeling engines may be arranged to enable users to create or import other text, images, visualizations, or the like, from other sources rather than being limited to using insight items or scratch panel items. For example, for some embodiments, annotation 616 represents a text annotation that has been added to story panel 602.

In one or more of the various embodiments, modeling engines may be arranged to automatically resize story panels as story items may be added. In this example, story panel 602 is illustrated using dashed lines the extend outside of the border of user interface 600 to indicate that the modeling engine has automatically increases its size or otherwise adjusts its geometry to accommodate the story items that have been added.

Generalized Operations

FIGS. 7-10 represent generalized operations for interactive interface for data analysis and report generation in accordance with one or more of the various embodiments. In one or more of the various embodiments, processes 700, 800, 900, and 1000 described in conjunction with FIGS. 7-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-10 may be used for interactive interface for data analysis and report generation in accordance with at least one of the various embodiments, architectures, or user interfaces such as those described in conjunction with FIGS. 4-6. Further, in one or more of the various embodiments, some or all of the actions performed by processes 700, 800, 900, and 1000 may be executed in part by modeling engine 322, visualization engine 324, or the like, running on one or more processors of one or more network computers.

Figure 7:
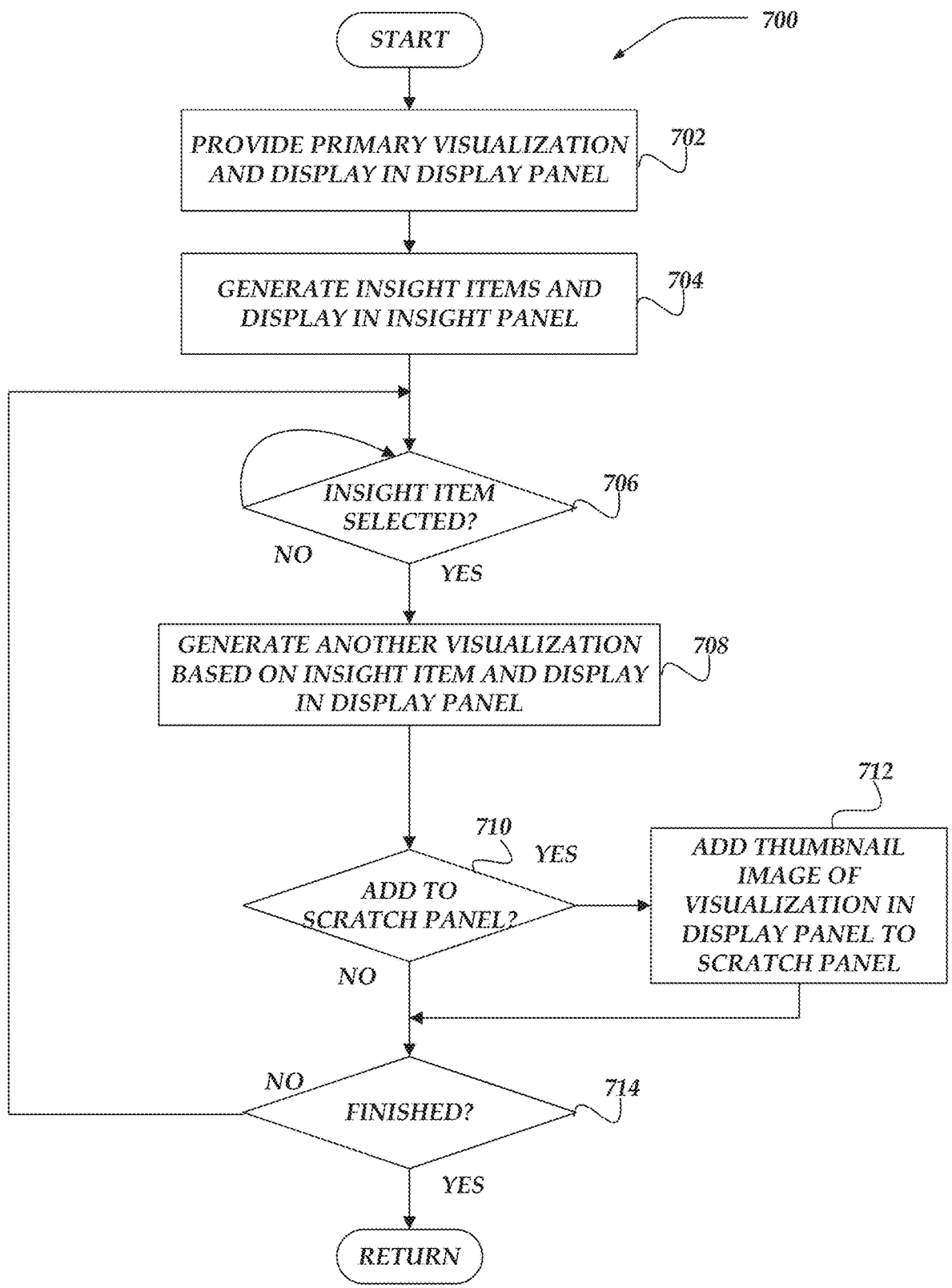
FIG. 7 illustrates an overview flowchart of a process for interactive interface for data analysis and report generation in accordance with one or more of the various embodiments.

FIG. 7 illustrates an overview flowchart of process 700 for interactive interface for data analysis and report generation in accordance with one or more of the various embodiments. After a start block, at start block 702, in one or more of the various embodiments, a modeling engine may be provided a primary visualization that may be displayed in a display panel. As described above, primary visualizations may be selected by a user or automatically selected based on a default rule. For example, in some embodiments, a user viewing a visualization become interested in understanding more about the underlying data that contributed to the visualization they are viewing. In this example, the modeling engine may be arranged to provide a user interface control (e.g., button, menu item, or the like) that enables users to start an analysis session based on the visualization they are viewing. Accordingly, in this example, the visualization being viewed by the user may be provided to the modeling engine as the primary visualization for the analysis session.

At block 704, in one or more of the various embodiments, the modeling engine may be arranged to generate one or more insight items that may be displayed in an insight panel. In some embodiments, modeling engines may be arranged to employ one or more assessment models to determine one or more insight items to list in the insight panel.

At decision block 706, in one or more of the various embodiments, if an insight item may be selected, control may flow to block 708; otherwise, control may be loop back to decision block 706. As described above, insight panels may be arranged to enable users to interact with the listed insight items. For example, in some embodiments, a user may be enabled to employ a pointing device, such as, a mouse, to select insight items by clicking them with the pointing device.

At block 708, in one or more of the various embodiments, the modeling engine may be arranged to generate another visualization based on the selected insight item. In some embodiments, the other visualization may be displayed in the display panel. In some embodiments, the other visualization may be considered a new primary visualization. Also, in some embodiments, the primary visualization that was used at the start of the analysis session may remain the primary visualization even though the other visualization is displayed in the display panel.

In one or more of the various embodiments, modeling engines may be arranged to update or modify the insight items based on the other visualization. In some embodiments, this may occur if the other visualization is considered the new primary visualization. Also, in some embodiments, the insight items may be updated based on the other visualization even if it is not the primary visualization.

At decision block 710, in one or more of the various embodiments, if the selected insight item or visualization may be added to the scratch panel, control may flow to block 712; otherwise, control may flow to decision block 714. In one or more of the various embodiments, modeling engines may be arranged to automatically add selected visualizations or insight items to the scratch panel. In some embodiments, modeling engines may be arranged to selectively add visualization or insight items to the scratch panel based on user input or other rules.

At block 712, in one or more of the various embodiments, the modeling engine may be arranged to add thumbnail image that may be associated with the previous primary visualization to a scratch panel. In one or more of the various embodiments, visualizations or insight items included in scratch panels may be illustrated using thumbnails or otherwise minimized visual representations of the added visualizations or insight items. In some embodiments, the necessary thumbnails may be minimized views that mimic the appearance of the visualizations or insight items that they represent.

At decision block 714, in one or more of the various embodiments, if the analysis session may be finished, control may be returned to a calling process; otherwise, control may loop back to block decision block 706. In one or more of the various embodiments, modeling engines may be arranged to enable users to interactively analyze the primary visualization or its underlying data based on the insight items listed in the insight panel. Accordingly, in some embodiments, if the user finishes their analysis session, the session may be terminated. Otherwise, the user may continue interacting with one or more of the insight panel, scratch panel, display panel, or the like, until they are finished with the analysis session.

Next, in one or more of the various embodiments, control may be returned to a calling process.

Figure 8:
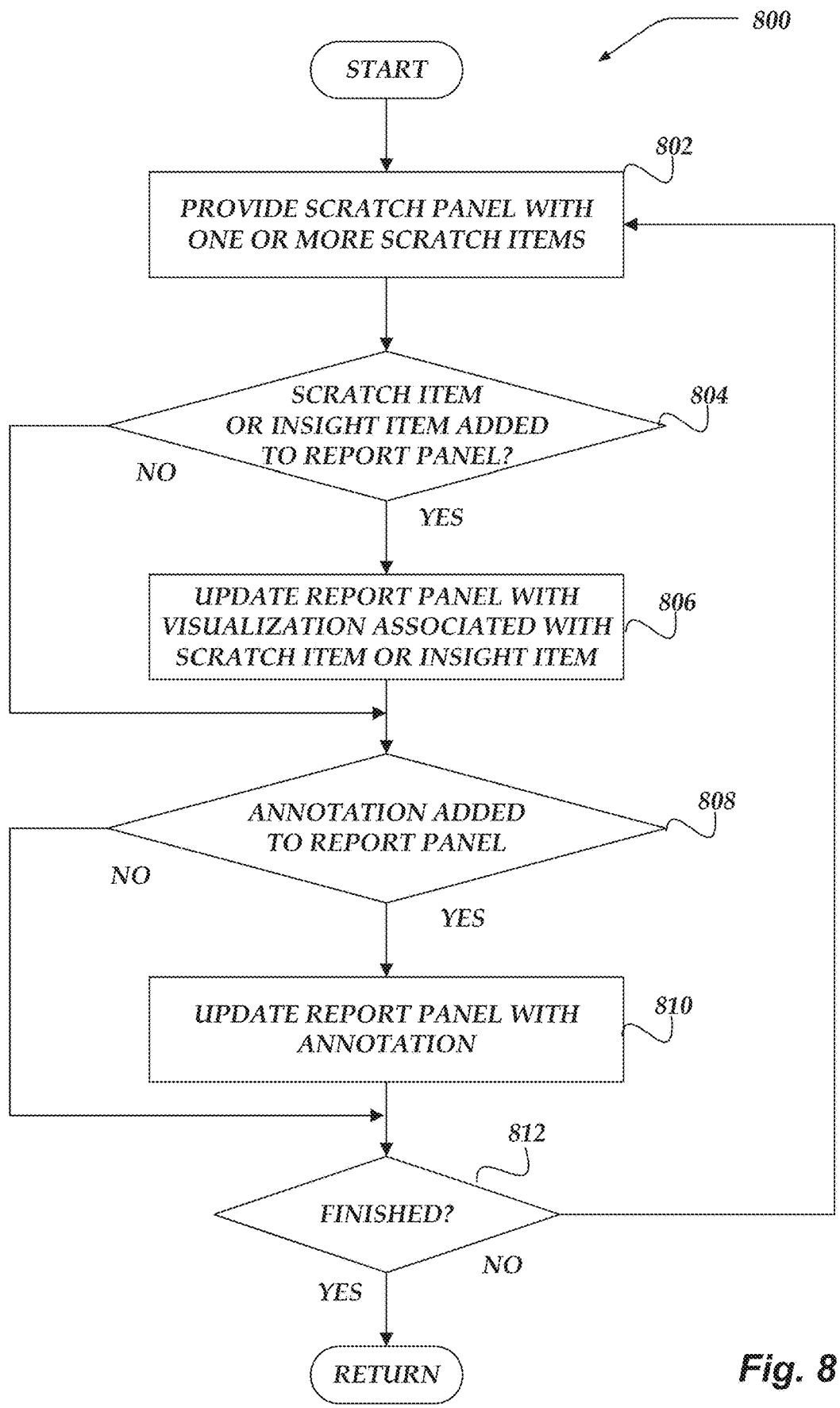
FIG. 8 illustrates a flowchart of a process for generating a report based on a scratch pad panel in accordance with one or more of the various embodiments.

FIG. 8 illustrates a flowchart of process 800 for generating a report based on a scratch pad panel in accordance with one or more of the various embodiments. After a start block, at start block 802, in one or more of the various embodiments, modeling engines may be arranged to generate a scratch panels that may list one or more scratch panel items. As described above, in some embodiments, modeling engines may be arranged to provide scratch panels to automatically track or record some or all of the visualizations or insight items that may have reviewed during a user's analysis session. In some embodiments, scratch panels provide a visual reference that enables users to revisit recently viewed visualizations or insight items.

At decision block 804, in one or more of the various embodiments, if a scratch panel item or insight item may be added to a report panel, control may flow to block 806; otherwise, control may flow to decision block 808. In one or more of the various embodiments, as described above, report panels may be panels arranged to accepted visualizations, insight items, or annotations that may be combined into an interactive report that may be stored or shared.

Accordingly, in some embodiments, modeling engines may be arranged to enable users to select one or more scratch panel items or one or more insight items to add to the report panel.

At block 806, in one or more of the various embodiments, the modeling engine may be arranged to update the report panel with a visualization associated with the scratch panel item. In some embodiments, modeling engines may be arranged to append or prepend the scratch panel item ahead or behind other report items in the report panel. In some embodiments, the scratch panel item may be inserted in between two report items in the report panel.

In some embodiments, the modeling engine may be arranged to automatically expend or contract the size of the report panel based on the report items that it may be include. Note, in some embodiments, a portion (a view window) of the report panel may be displayed while the remainder is maintained off-screen.

At decision block 808, in one or more of the various embodiments, an annotation may be added to the report panel, control may flow to block 810; control may flow to decision block 812. In one or more of the various embodiments, annotations may be considered any item, such as, text, images, comment blocks, legends, summaries, links, bookmarks, or the like, that may be added to a report. In some embodiments, annotations may be selected from sources other than the scratch panel or the insight panel.

Also, in one or more of the various embodiments, annotations may include additional user interface controls that may be included in interactive reports. For example, one or more report items may be associated with a user interface control that hides or shows the one or more report items based on user interactions or user input.

At block 810, in one or more of the various embodiments, the modeling engine may be arranged to update the report panel to include the annotation. Similar, to the description for block 806, modeling engines may be arranged to update the report panel and the report to include the one or more annotations.

At decision block 812, in one or more of the various embodiments, if the report session may be finished, control may be returned to a calling process; otherwise, control may loop back to block 802. In one or more of the various embodiments, modeling engines may be arranged to enable users to interactively construct a report by iteratively adding, moving, or removing items from the report. Accordingly, if the user is finished with the report, they may store it for use in the future or they may share it with others.

Next, in one or more of the various embodiments, control may be returned to a calling process.

Figure 9:
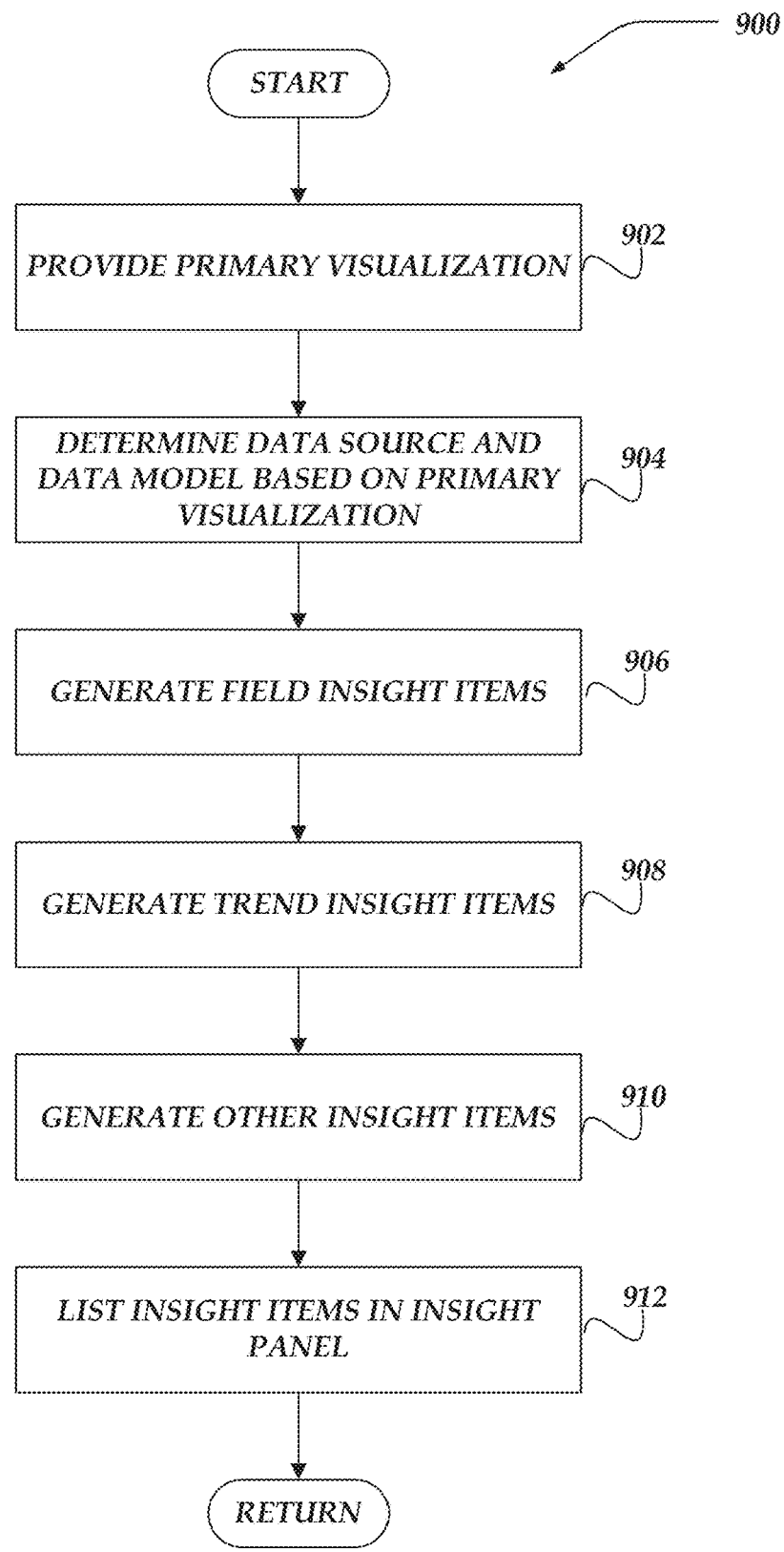
FIG. 9 illustrates a flowchart of a process for providing an interactive interface for data analysis and report generation in accordance with one or more of the various embodiments.

FIG. 9 illustrates a flowchart of process 900 for providing an interactive interface for data analysis and report generation in accordance with one or more of the various embodiments. After a start block, at start block 902, in one or more of the various embodiments, a visualization may be provided to a modeling engine. In some embodiments, the modeling engine may be arranged to display the visualization in a display. In some embodiments, the visualization may be a primary visualization. In some embodiments, modeling engines may be arranged to enable users to initiate an analysis session with a primary visualization. In some embodiments, the initial primary visualization may be considered the primary visualization until a user finishes the analysis session or select a different primary visualization. Alternatively, in some embodiments, the primary visualization may be considered the visualization that is current displayed in the displayed. Thus, in some embodiments, each time a visualization associated with an insight item may be selected from the insight panel and displayed in the display panel it may be considered the new primary visualization. Further, in one or more of the various embodiments, modeling engines may be arranged to provide user interface controls (e.g., buttons, toggles, menu items, or the like) that enable users to expressly assign a visualization to be the primary visualization.

In one or more of the various embodiments, the primary visualization may be considered to be the visualization that drives the determination of the insight items.

At block 904, in one or more of the various embodiments, the modeling engine may be arranged to determine a data source or one or more data models that may be associated with the primary visualization. In one or more of the various embodiments, modeling engines may be arranged to determine the data sources or data model associated with the primary visualization based on lookup tables, maps, catalogs, or the like, that associate data sources or data models with a visualization. In some embodiments, the visualization model associated with a primary visualization may define the data sources or data models that are associated with the primary visualization.

At block 906, in one or more of the various embodiments, the modeling engine may be arranged to generate one or more field insight items. In one or more of the various embodiments, field insight items may be insight items related to recommending one or more data fields that may provide insight into the meaning of primary visualization. For example, if the primary visualization includes values that are based on combination of two or more data fields, a relevant field insight item may be plots of the individual data fields that were combined in the primary visualization to provide insights into how each component data field contributes to the value displayed in the primary visualization. Likewise, in some embodiments, fields insight items may be data fields that may often be used in combination with one or more of the data fields used by in the primary visualization. For example, if modeling engines identify one or more data fields that are commonly used together with one or more data fields in the primary visualization, these data fields may be considered insight items.

In one or more of the various embodiments, field insight items may be associated with narrative information that may explain the relevance of each field insight item. Likewise, field insight items may be associated with an insight score that may be employed to rank order field insight items against each other. As described above, the particular actions or criteria performed to identify or evaluate field insight items may be defined in one or more assessment models.

At block 908, in one or more of the various embodiments, the modeling engine may be arranged to generate one or more trend insight items. Similar to field insight items, trend insight items may be associated with visualization or data fields that show trends associated with one or more data field or data object associated with the primary visualization. For example, if the primary visualization includes plots based on aggregate values of data fields, visualizations that include plots of values of the component fields over time may be considered for candidate trend insight items.

Similar to field insight items, in some embodiments, trend insight items may be associated with narrative information that may explain the relevance of each trend insight item. Likewise, in some embodiments, trend insight items may be associated with an insight score that may be employed to rank order trend insight items against each other. As described herein, the particular actions or criteria performed to identify or evaluate trend insight items may be defined in one or more assessment models.

At block 910, in one or more of the various embodiments, the modeling engines may be arranged to generate one or more other insight items. One of ordinary skill in the art will appreciate that field insight items or trend insight items represent non-limiting examples of the kind of insight items that may be determined. Accordingly, in some embodiments, assessment models may be provided to determined various kinds of insight items based on a variety of criteria. In some embodiments, the criteria may be tailored to local needs or local requirements. Thus, in some embodiments, modeling engines may be arranged to employ any number of assessment models to determine different kinds of insight items. In some embodiments, modeling engines may be arranged to determine the kinds of insight items or which assessment models to employ based on rules, instructions, classifiers, or the like, provided via configuration information.

At block 912, in one or more of the various embodiments, the modeling engine may be arranged to list the insight items in an insight panel that may be displayed in a user interface. In some embodiments, the determined insight items may initially be considered candidate insight items until are listed in an insight panel. Accordingly, in some embodiments, modeling engines may be arranged to employ various criteria, such as insight scores, or the like, determine which of the candidate insight items should be listed in the insight panel. In some embodiments, user or organization preferences may influence which insight items may be listed in the insight panel. For example, in some embodiments, modeling engines may be arranged to enable users or organizations to set limits on the number of insight items to list in the insight panel. Likewise, in some embodiments, modeling engines may be arranged to enable users or organizations to set preference values to include or exclude entire kinds of insight items from being listed in the insight panel.

Next, in one or more of the various embodiments, control may be returned to a calling process.

Figure 10:
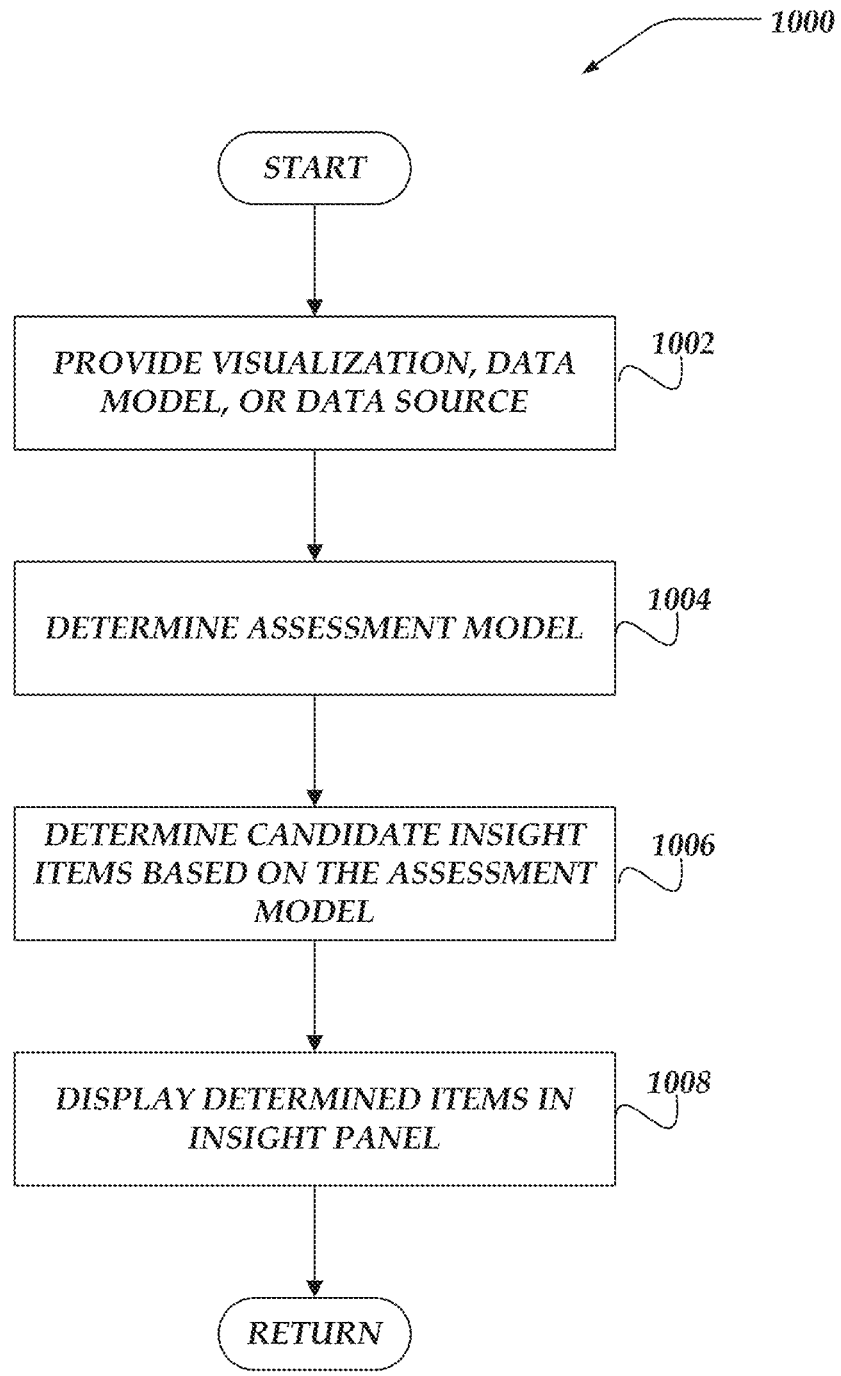
FIG. 10 illustrates a flowchart of a process for determining insight items providing an interactive interface for data analysis and report generation in accordance with one or more of the various embodiments.

FIG. 10 illustrates a flowchart of process 1000 for determining insight items providing an interactive interface for data analysis and report generation in accordance with one or more of the various embodiments. After a start block, at start block 1002, in one or more of the various embodiments, a visualization, one or more data models, one or more data sources, or the like, may be provided to a modeling engine. As described above, modeling engines may be provided a primary visualization that may be associated with a data model or data source. In some embodiments, modeling engines may be arranged to determine a data model or data source from a visualization based on a table, map, lists, or the like, that maintains a record of which data models or data sources may be associated with a given visualization. In some embodiments, a visualization model that the visualization is based on may be arranged to include references or identifiers that enable the modeling engine to determine the data model or data source associated with a visualization. Further, in some embodiments, another process, such as, a visualization engine may be arranged to provide APIs that enable modeling engines to determine the data model or data source based on a visualization or visualization model.

At block 1004, in one or more of the various embodiments, the modeling engine may be arranged to determine one or more assessment models. In one or more of the various embodiments, modeling engines may be arranged to employ different assessment models for different types of insight items. In some embodiments, one or more assessment models may be associated with particular data models, data sources, or visualizations. Likewise, in some embodiments, one or more assessment models may be arranged to be employed to assess some or all data models, data sources, visualizations, or the like, to determine insight items.

In some embodiments, users or organizations may be enabled to associate some or all assessment models with data models, data sources, or visualizations to reflect user or organization preferences. For example, in one or more of the various embodiments, an organization may prefer to employ a limited number of assessment models to conform to various constraints, such as, resource limitations, licensing restrictions, or the like. Also, in some embodiments, users or organizations may prefer to use some types of insight items over other types of insight items. Accordingly, in some embodiments, modeling engines may be arranged to employ one or more rules, instructions, preference information, or the like, provided via configuration information that may determine if an assessment model should be employ to determine insight items for a visualization.

Also, in one or more of the various embodiments, modeling engines may be arranged to determine more than one assessment model and employ them in parallel to determined insight items.

At block 1006, in one or more of the various embodiments, the modeling engine may be arranged to determine one or more candidate insight items based on the assessment model. As described above, assessment models may be configured to identify one or more insight items based on determining visualizations, data fields, data models, or the like, the meet the criteria defined by individual assessment models. In some embodiments, assessment models may be configured to assign an insight score that may enable insight items provided by the same or different assessment models to be rank ordered. Accordingly, in some embodiments, insight items that have not been confirmed for display in the insight panel may be considered candidate insight items.

At block 1008, in one or more of the various embodiments, the modeling engine may be arranged to display one or more of the insight items in an insight panel.

In one or more of the various embodiments, modeling engines may be arranged to execute one or more actions to select, sort, or filter the candidate insight items determined by the assessment models. In one or more of the various embodiments, modeling engines may be enabled to select, sort, or filter the candidate insight items based on various criteria, including, insight scores, user/organization preferences, licensing restrictions, data access restrictions, or the like. For example, modeling engines may be arranged to disregard insight items that have an insight score that falls below a threshold value. Likewise, for example, modeling engines may be arranged to disregard insight items that are based on visualizations or data that the user is restricted from viewing or accessing.

Accordingly, in some embodiments, modeling engines may determine that some or all of the candidate insight items may be insight items that should be displayed in the insight panel.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed is:

1. A method for managing insights in reports and providing explanations for the insights, performed at a computing device having a display, one or more processors and memory storing one or more programs configured for execution by the one or more processors, the method comprising:
providing a primary report that is associated with a data model in a graphical user interface (GUI); and
in response to a user's interaction with the primary report or the user opening the primary report, performing actions:
generating an insight item and an associated natural language narrative based on the data model, wherein the insight item includes an insight visualization and the associated natural language narrative that explains a meaning for the insight item and a relevance for one or more of a trend or an insight associated with the insight item;
employing the GUI to display an insights pane that provides an interactive display of the insight item and the associated natural language narrative;
in response to a user's interaction with the insights pane displayed by the GUI, selecting the insight item; and
displaying the insight item in the GUI.

2. The method of claim 1, further comprising:
generating one or more insight items based on the primary report and the data model, wherein the one or more insight items correspond to one or more of analytical information, another data model, or a data source related to one or more reports that share one or more portions of the data model.

3. The method of claim 1, further comprising:
generating one or more narratives that are displayed in the insights pane, wherein the one or more narratives explain a context for the displayed insight item.

4. The method of claim 1, further comprising:
providing a correspondence between the insight item and one or more of analytical information, another data model, or a data source related to one or more reports that share one or more portions of the data model.

5. The method of claim 1, further comprising:
in response to selecting the insight item, generating another report for display in the GUI instead of the primary report; and
generating a scratch item that includes a thumbnail view of the primary report for display in a scratch pane.

6. The method of claim 1, further comprising:
generating another report in response to selection of one of another insight item displayed in the insight pane or a scratch item displayed in a scratch pane, wherein the other report is displayed in the GUI instead of a currently displayed report.

7. The method of claim 1, wherein generating the insight item further comprises:
employing one or more assessment models to generate one or more candidate insight items associated with one or more insight scores; and
determining the insight item based on those candidate insight items having the one or more insight scores that exceed a threshold value.

8. A network computer for managing insights in reports and providing explanations for the insights, comprising:
a memory that stores at least instructions; and
one or more processors that execute instructions that are configured to cause performance of actions, including:
providing a primary report that is associated with a data model in a graphical user interface (GUI); and
in response to a user's interaction with the primary report or the user opening the primary report, performing actions:
generating an insight item and an associated natural language narrative based on the data model, wherein the insight item includes an insight visualization and the associated natural language narrative that explains a meaning for the insight item and a relevance for one or more of a trend or an insight associated with the insight item;
employing the GUI to display an insights pane that provides an interactive display of the insight item and the associated natural language narrative;
in response to a user's interaction with the insights pane displayed by the GUI, selecting the insight item; and
displaying the insight item in the GUI.

9. The network computer of claim 8, further comprising:
generating one or more insight items based on the primary report and the data model, wherein the one or more insight items correspond to one or more of analytical information, another data model, or a data source related to one or more reports that share one or more portions of the data model.

10. The network computer of claim 8, further comprising:
generating one or more narratives that are displayed in the insights pane, wherein the one or more narratives explain a context for the displayed insight item.

11. The network computer of claim 8, further comprising:
providing a correspondence between the insight item and one or more of analytical information, another data model, or a data source related to one or more reports that share one or more portions of the data model.

12. The network computer of claim 8, further comprising:
in response to selecting the insight item, generating another report for display in the GUI instead of the primary report; and
generating a scratch item that includes a thumbnail view of the primary report for display in a scratch pane.

13. The network computer of claim 8, further comprising:
generating another report in response to selection of one of another insight item displayed in the insight pane or a scratch item displayed in a scratch pane, wherein the other report is displayed in the GUI instead of a currently displayed report.

14. The network computer of claim 8, wherein generating the insight item further comprises:
employing one or more assessment models to generate one or more candidate insight items associated with one or more insight scores; and
determining the insight item based on those candidate insight items having the one or more insight scores that exceed a threshold value.

15. A processor readable non-transitory storage media that includes instructions that are configured to cause management of insights in reports and providing explanations for the insights, wherein execution of the instructions by one or more processors, enables performance of actions, comprising:
providing a primary report that is associated with a data model in a graphical user interface (GUI); and
in response to a user's interaction with the primary report or the user opening the primary report, performing actions:
generating an insight item and an associated natural language narrative based on the data model, wherein the insight item includes an insight visualization and the associated natural language narrative that explains a meaning for the insight item and a relevance for one or more of a trend or an insight associated with the insight item;
employing the GUI to display an insights pane that provides an interactive display of the insight item and the associated natural language narrative;
in response to a user's interaction with the insights pane displayed by the GUI, selecting the insight item; and
displaying the insight item in the GUI.

16. The processor readable non-transitory storage media of claim 15, further comprising:
generating one or more insight items based on the primary report and the data model, wherein the one or more insight items correspond to one or more of analytical information, another data model, or a data source related to one or more reports that share one or more portions of the data model.

17. The processor readable non-transitory storage media of claim 15, further comprising:
generating one or more narratives that are displayed in the insights pane, wherein the one or more narratives explain a context for the displayed insight item.

18. The processor readable non-transitory storage media of claim 15, further comprising:
providing a correspondence between the insight item and one or more of analytical information, another data model, or a data source related to one or more reports that share one or more portions of the data model.

19. The processor readable non-transitory storage media of claim 15, further comprising:
in response to selecting the insight item, generating an alternate report for display in the GUI instead of the primary report; and
generating a scratch item that includes a thumbnail view of the primary report for display in a scratch pane.

20. The processor readable non-transitory storage media of claim 15, further comprising:
generating another report in response to selection of one of another insight item displayed in the insight pane or a scratch item displayed in a scratch pane, wherein the other report is displayed in the GUI instead of a currently displayed report.

* * * * *